(12) United States Patent
Lewis

(10) Patent No.: US 11,760,176 B2
(45) Date of Patent: *Sep. 19, 2023

(54) SOFT FRONT COCKPIT COVER WITH LINKAGE

(71) Applicant: Bestop, Inc., Louisville, CO (US)

(72) Inventor: Stephen J. Lewis, Harrison Township, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,461

(22) Filed: May 16, 2022

(65) Prior Publication Data

US 2022/0274474 A1 Sep. 1, 2022

Related U.S. Application Data

(63) Continuation of application No. 16/998,772, filed on Aug. 20, 2020, now Pat. No. 11,364,779, which is a continuation-in-part of application No. 16/945,107, filed on Jul. 31, 2020, now Pat. No. 11,364,780.

(60) Provisional application No. 62/891,639, filed on Aug. 26, 2019, provisional application No. 62/882,221, filed on Aug. 2, 2019.

(51) Int. Cl.
*B60J 7/12* (2006.01)

(52) U.S. Cl.
CPC .......... *B60J 7/1247* (2013.01); *B60J 7/1239* (2013.01); *B60J 7/1243* (2013.01)

(58) Field of Classification Search
CPC . B60J 7/1291; B60J 7/11; B60J 7/1265; B60J 7/71243; B60J 7/1247
USPC .................................................. 296/218, 219
See application file for complete search history.

(56) References Cited

U.S. PATENT DOCUMENTS

| 9,539,888 B2 | 1/2017 | Haberkamp et al. |
| 2016/0236556 A1 | 8/2016 | Smith et al. |
| 2016/0263975 A1 | 9/2016 | Bowles |

*Primary Examiner* — Joseph D. Pape
(74) *Attorney, Agent, or Firm* — Warn Partners, P.C.

(57) ABSTRACT

An articulating soft front cockpit cover assembly including an auxiliary tensioning link, coupling link and cross-car bow. A pivot point rotatable joining the auxiliary tensioning link and coupling link is located at the top of the auxiliary tensioning link. A bracket is provided on the auxiliary tensioning link or coupling link and extends cross-car and attaches to the front or rear edge of the cross-car bow. The soft front cockpit cover assembly in sealing engagement with a rearward top portion of a roof. The articulating portion movable between at least a closed position over about the front vehicle cockpit and at least one open position for an open-air feel.

20 Claims, 14 Drawing Sheets

SOFT FRONT COCKPIT COVER WITH LINKAGE

CROSS-REFERENCE TO RELATED APPLICATIONS

This application is a is a continuation of U.S. patent application Ser. No. 16/998,772, filed Aug. 20, 2020, which is a continuation-in-part of U.S. patent application Ser. No. 16/945,107, filed Jul. 31, 2020, which claims the benefit of U.S. Provisional Application No. 62/882,221, filed Aug. 2, 2019. This application also claims the benefit of U.S. Provisional Application No. 62/891,639, filed Aug. 26, 2019. The disclosures of the above applications are incorporated herein by reference.

FIELD OF THE INVENTION

The present invention relates to a roof top assembly including at least one soft panel top cover that seals against a rear top portion of the roof of a vehicle.

BACKGROUND OF THE INVENTION

Providing convertible tops for sport utility (SUV) type vehicles is desired. Foldable stowable roof soft tops are commonly used in sport-utility vehicles for recreational purposes. The foldable roof is typically moved between a stowed position, and a deployed position. When in the deployed position, the foldable roof protects the occupants of the vehicle from various weather conditions. The foldable roof also includes various sections which are made of a clear material to essentially function as a window, allowing the occupant of the vehicle to see outside of the vehicle. However, there are occasions where the weather is pleasant, and it is desired by the occupants of the vehicle to move the foldable roof to an open position such that the vehicle essentially functions without part of a roof or essentially functions without a roof, and the passenger compartment of the vehicle is exposed to the atmosphere. This allows the occupants of the vehicle to enjoy more favorable weather conditions while driving.

An alternative to the convertible soft top is to use a hard top that is bulky and does not provide any open-air feel without removing the entire top. If the entire hard top is removed, it then must be stored, which is often difficult because of the size of the top. Other convertible roofs use a hard top that is large and bulky and does not provide any open-air feel without removing two front top panels, which is also laborious, difficult, time consuming, and ergonomically disadvantageous. If one or more of the front top panels are removed, they then must also be stored, which is often difficult because of the size weight of the panels. While this will give the occupant an open air feel, the panels are large and bulky. If the occupant wants to gain the open air feel they need to exit the vehicle and remove the panels using multiple knobs and latches and then store the panels. This makes for a time consuming operation as well as a potential storage issue due to the size of the panels. They are also hard to handle due to their size and weight and due to the fact they must be installed and removed over the operators head. In the event of inclement weather, the panels also cannot be quickly put back in place.

Accordingly, there exists a need for a more manageable and easily stowable top made of articulable material or arrangement to provide an efficient light weight top that can be effectively opened quickly to provide what is often referred to as an open air feel, where a portion of the top of the roof is moved from a closed or deployed position to at least one open or stowed position exposing a portion of the inside vehicle cockpit/passenger compartment to the outside without removing the top.

SUMMARY OF THE INVENTION

The present invention is directed to a foldable roof assembly having a soft front cockpit cover assembly that is in operable sealing engagement with a hard-top portion of the roof. The soft panel top assembly has a pivotal portion that is lightweight and folds back without the operator needing to leave the vehicle to give the occupant a quick and easy sunroof/open air feeling in the front cockpit. This is done more easily than with typical two-panel hard top systems that are more time consuming to disengage from the vehicle and are bulky to handle and remove. The present invention also eliminates storage issues since the soft panel top folds back rather than having to be removed entirely and stored as with conventional hard top panels.

The soft front cockpit cover assembly preferably includes two door rails operably connected to side sport bars of the vehicle (or other vehicle component(s)) and a rear header operably connected to the vehicle. The soft front cockpit cover assembly includes an articulating portion including a front side rail operably connected to first bow (or tensioning bow), a rear header and a coupling link, which coupling link is operably connected to a 2-bow and an auxiliary tensioning link. Preferably, at least one pivot point for the articulating portion is provided on each door rail, door rail bracket(s) or directly to the sport bar or other predetermined vehicle structure, most preferably, provided directly on the rear header. The articulating portion cycles between a closed position and at least one open position, preferably an open sunroof position. Most preferably, the rear header is a closeout for operable sealing engagement with a hard-top roof portion. The rear header is most preferably lightweight by using a lighter rear header, e.g., rear header closeout that is a wireframe and/or lightweight molded piece and/or plurality of lightweight molded section(s) operably connected together, or any suitable combination thereof, and by using minimal framing and using soft goods. The foregoing all further helps with ease of installation and ease of cycle efforts of the pivotal portion. Further, preferably, the assembly is mountable to the vehicle without any modification, drilling of holes, or any other change to existing hardware and structure to the vehicle other than the removal of the manufacturer existing front cockpit panel, e.g., hard panel(s).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
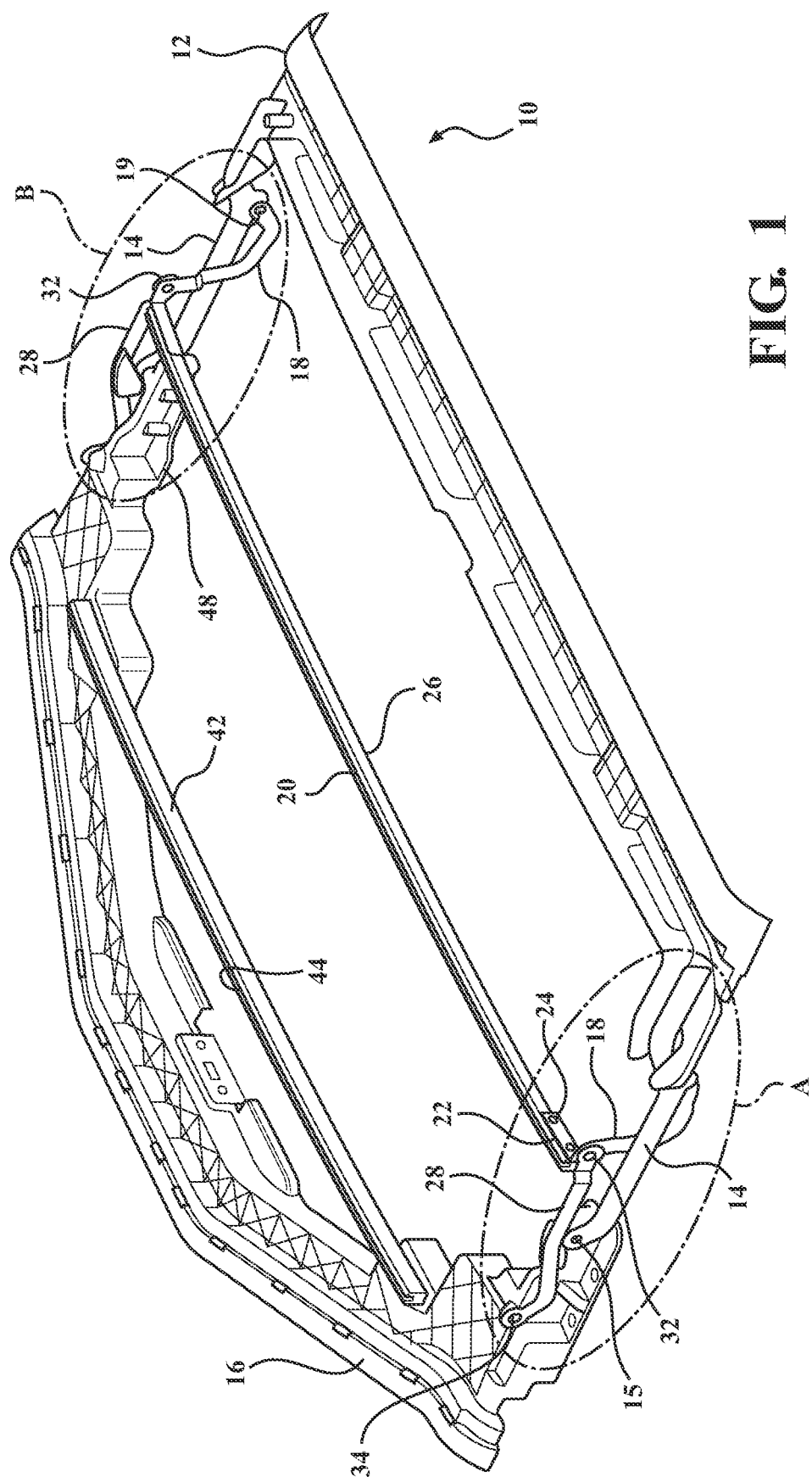
FIG. 1 is a perspective view of a soft panel top cover assembly with a pivot point at the top of an auxiliary tensioning link and a cross-car bow connected to a coupling link, in accordance with the present invention.
Figure 2:
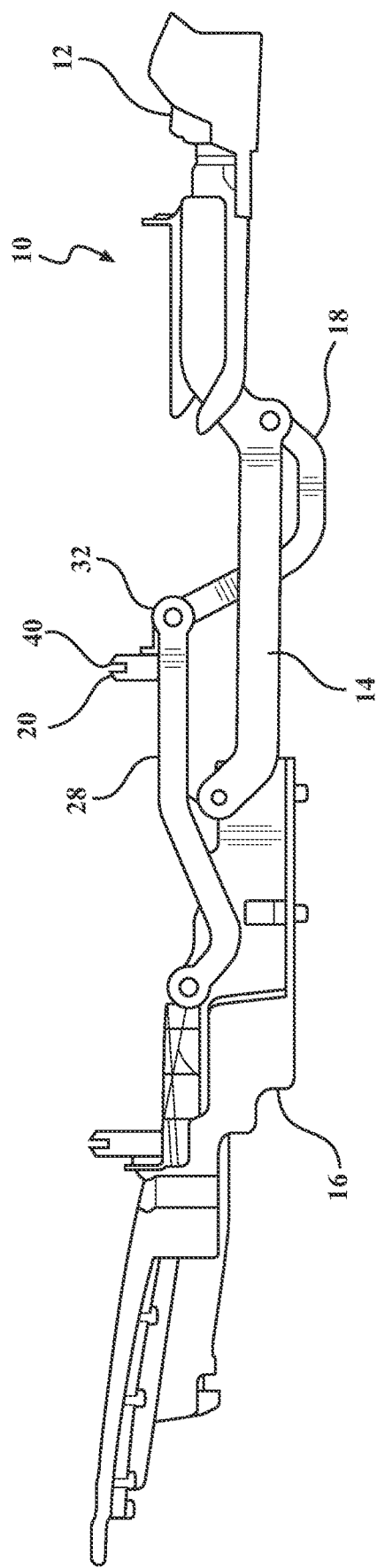
FIG. 2 is an enlarged side elevation view of FIG. 1.
Figure 3:
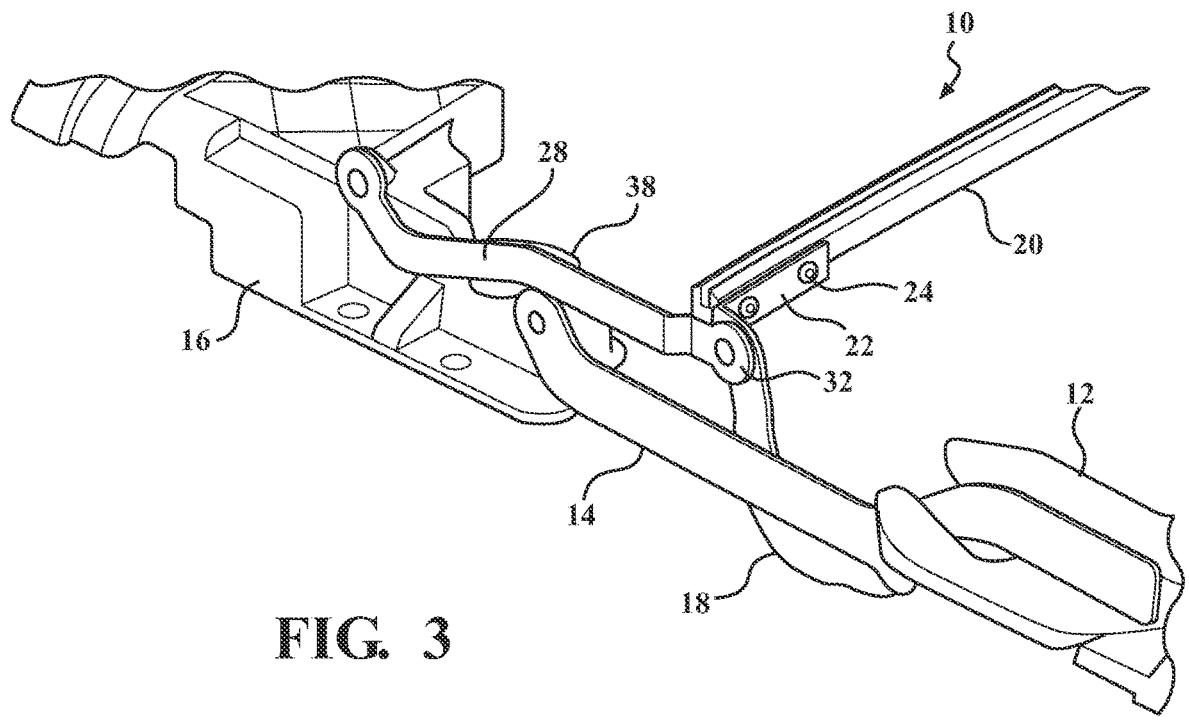
FIG. 3 is an enlarged perspective view taken from 'A' of FIG. 1.

The following description of the preferred embodiment(s) is merely exemplary in nature and is in no way intended to limit the invention, its application, or uses.

Referring to FIGS. 1-7, there is depicted a soft top cover assembly shown generally at 10 including a tensioning bow 12, e.g., front header, connected to a front side rail 14. A rear header 16 is connected to the vehicle and the front side rail 14 is preferably connected to the rear header 16. Most preferably, a pivot point 15 is provided on the rear header at the front side rail 14 attachment. Other suitable front side rail 14 attachment locations on alternative components are contemplated depending on the application without departure from the scope of the present invention. A coupling link 18 is connected to a cross-car bow 20, e.g., 2-bow, which bow 20 is operably connected to a cover 17 that is a roof top soft cover. The coupling link 18 is connected to the front side rail 14 at pivot point 19. A bracket 22 of the coupling link 18 is connected to the cross-car bow 20. Preferably, the bracket 22 is an integrally formed flange of the coupling link 18 extending generally cross-car and connected to the cross-car bow 20 by at least one fastener 24. Alternatively, the bracket 22 is a weld-on bracket (e.g., bracket). Most preferably, the bracket 22 is a generally transverse member of the coupling link 18 extending generally cross-car and is connected to the front side 26 of cross-car bow 20 by a plurality of fasteners 24. An auxiliary tensioning link 28 is connected to the coupling link 18 at a pivot point 32. The auxiliary tensioning link 28 is also connected to the rear header 16 at pivot point 34.

The pivot point 32 is advantageously located at the top of the auxiliary tensioning link 28. The cross-car bow 20 is connected to the coupling link 18 inboard to the pivot point 32/auxiliary tensioning link 28. The combination of pivot point 32 location at the top of the auxiliary tensioning link 28, and the bow 20 connected to the coupling link 18 interior to the auxiliary tensioning link 28 provides significant advantages, including, but not limited to, superior rotation of the pivotal portion, shown generally at 36.

FIGS. 1-5 (and 17) depict a closed sunroof position or closed roof top position covering or closing off the front roof top opening, for a sport utility vehicle. Although an SUV is depicted, it is understood that the present invention is operably adaptable for any vehicle, including, but not limited to, any SUV type, pickup truck, UTV, ATV, etc. FIG. 6 depicts an exemplary open sunroof position. FIG. 7 depicts the pivotal portion during rotation between the open and closed positions. When the tensioning bow 12/front side rail 14 rotate rearward toward an open sunroof position, the coupling link 18, and the auxiliary tensioning link 28 connected to the rod 18 at pivot point 32, rotate rearward with the cross-car bow 20 to the open sunroof position.

At least one stop 38 is provided, preferably, at least one on each side of the assembly 10. Preferably, the stop 38 is provided on the auxiliary tensioning link 28. It is understood that any other suitable stop 38 location and type and combination of elements to provide a stop, e.g., set the height of at least one bow or pivotal portion, is contemplated depending on the application without departure from the scope of the present invention. It is understood that the stop 38 is adaptable to rest upon another suitable predetermined part of the assembly 10 without departure from the scope of the present invention. It is understood that any other stop suitably configured to set the height and contact at least one bow with rotation to the open position is contemplated without departure of the scope of the present invention. The stop 38 is generally a triangular-like shaped stop. Alternatively, the stop 38 is a smaller stand off with a diameter not larger than the width of the link to which it is attached (e.g. attached to or integrally formed on the auxiliary link 28).

It is understood that alternative pivot point 15,19,34 locations suitable for the pivoting of the articulating portion 36 depending on the application is/are contemplated without departure from the scope of the present invention.

Preferably, the cross-car bow 20 is a fabric management bow. Most preferably, the cross-car bow 20 is a fabric management bow operably coupled to the soft top cover 17 and operably configured and arranged to provide operable fabric management of the cover 17 between the closed position and the at least one open position (e.g., sunroof position). It is understood that more than one fabric management bow on articulating portion 36 (or any other predetermined location(s) of the assembly 10) can be provided depending on the application without departure from the scope of the present invention. Preferably, at least one channel 40 is provided to operably attach the cover 17 to the cross-car bow 20 (or any other predetermined location(s) of the assembly 10).

At least one additional bow 42 is operably connected to the rear header 16. Preferably, the least one additional bow 42 is a fabric management bow. Most preferably, the at least one additional bow 42 is a fabric management bow operably coupled to the soft top cover 17 and operably connected to a rear header 16, most preferably, fixedly connected to the rear header 16 such that the bow 42 has a fixed location. It is understood that more than one fabric management bow on the rear header (or any other predetermined location(s) of the assembly 10) can be provided depending on the application without departure from the scope of the present invention. Preferably, at least one channel 44 is provided to operably attach the cover 17 to the rear header 16 (or any other predetermined location(s) of the assembly 10). The at least one additional bow 42 is preferably fastened to the rear header, e.g. at least one screw, bolt, bracket etc). The fabric management bows manage the top cover as the assembly folds to the open position. The fabric management bows also minimize fabric movement in the closed position, which alleviates wind flap noise, in addition to managing the cover 17 during articulation and in the open position.

The rear header 16 operably seals with the rear top cover 46, e.g., hard top cover. The rear header 16 is preferably a lightweight injection molded material that is at least one piece, more preferably, a plurality of operably connected pieces, most preferably, at least three molded pieces operably connected together, e.g., fasteners, and/or bonded, and/or adhesive, and/or snap fit, and/or snap hook fit, and/or brackets, and/or mechanical fit, and/or mechanical fasteners and any combinations thereof. The rear header 16 preferably has at least two feet that rest on top of a cross vehicle member structure and helps set the height of the rear header 16 relative thereto. The rear header 16 includes at least one mounting surface 48 that operably connects to the vehicle, e.g., fasteners, mushroom fasteners/knobs, etc, connecting each mounting portion to a respective sport bar (vehicle roll bar). Alternatively, both sides of the rear header 16 only connects to respective door rails 50, which door rails 50 are connected to the vehicle (e.g., sport bars). Alternatively, there are no door rails.

Figure 5:
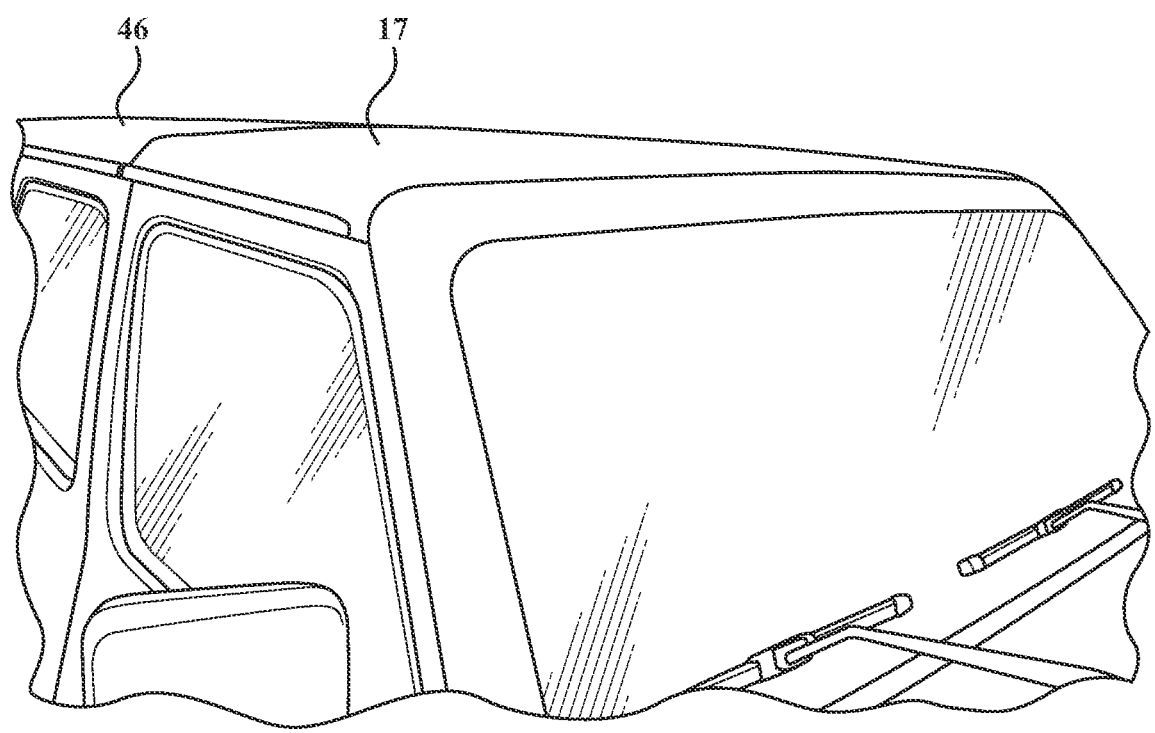
FIG. 5 is a perspective view of an exemplary vehicle with the soft panel top cover assembly in a closed position.
Figure 6:
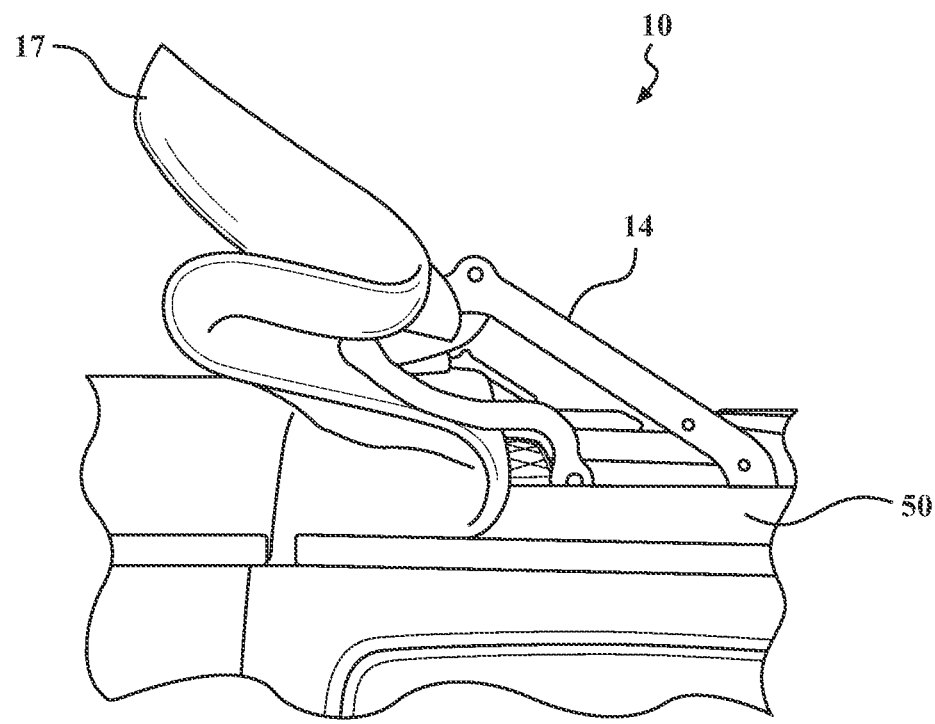
FIG. 6 is a side elevation view of the vehicle and assembly of FIG. 5 with the soft panel top cover assembly in an exemplary open position.
Figure 7:
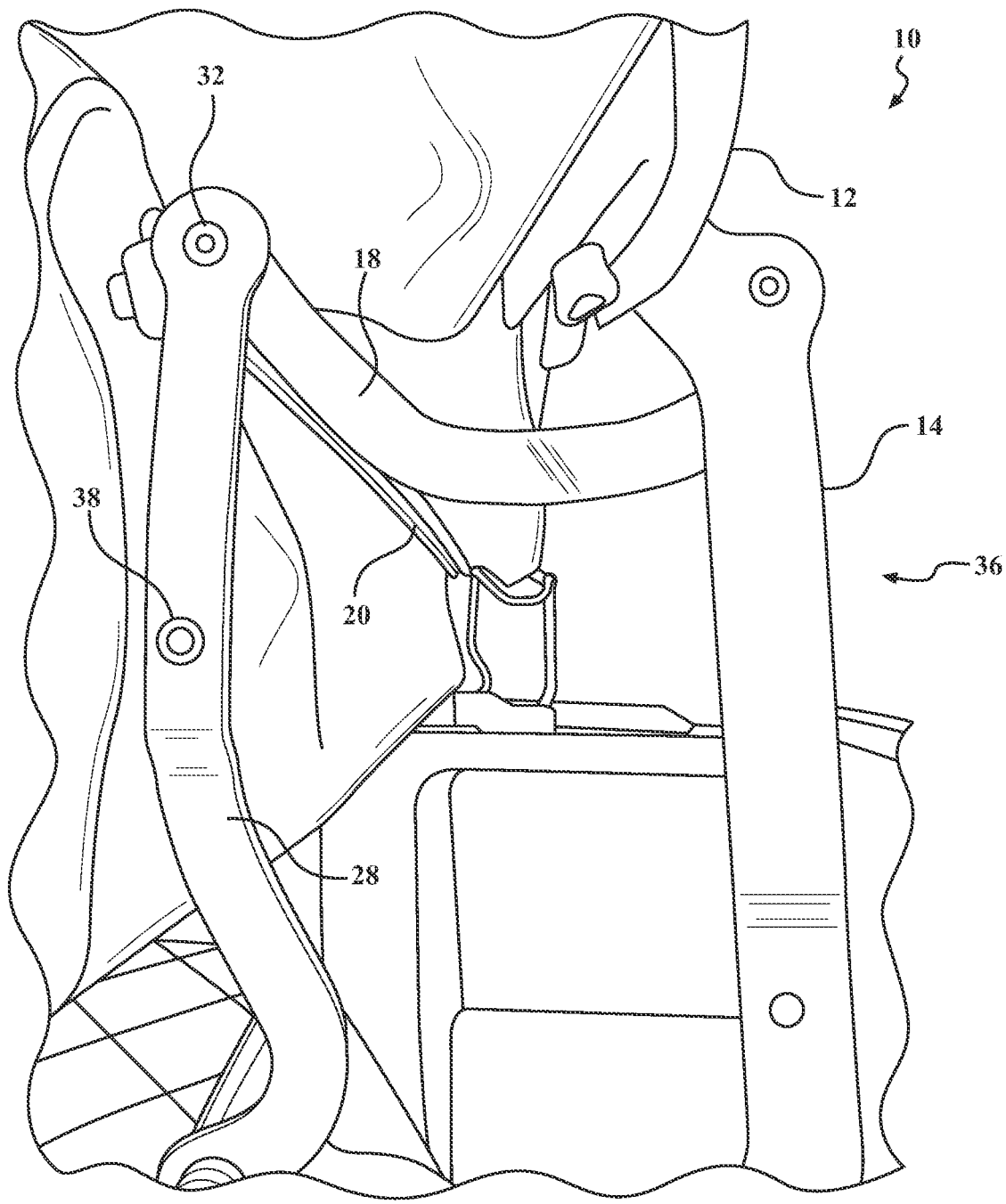
FIG. 7 is a side elevation view of the vehicle and assembly with the soft panel top cover assembly in a partially open position during cycling open/closed.

FIGS. 5-6 depicts a door rail 50 of the assembly 10 operably connecting to the vehicle, e.g., to the fore/aft sport bar on both sides of the vehicle, and/or for providing a mounting location for the rear header 16 and/or for operably providing a weather tight door seal or top cover seal, on each side and/or providing a drip rail, etc. Preferably, the door rail 50 is attached by at least one mounting surface, preferably, a first and second clamping surface attach to the vehicle (e.g., sport bar) using at least one fastener, e.g., fastener, threaded fastener, bolt, threaded mushroom knob fasteners etc. through at least one aperture through the at least one mounting surface Preferably, at least one mounting surface is provided on a rotatable member that rotates into engagement with the vehicle mounting surface. More preferably, the second clamping surface operable rotates up/down or side-to-side, most preferably, generally up/down to engage the underside of a vehicle part for mounting, e.g., under a sport bar, and preferably, the first mounting surface engages the upper side of the vehicle part for mounting, e.g., on top of the sport bar. The at least one mounting surface on each side of the header are preferably connected to the vehicle (e.g., sport bars). Alternatively, the top in accordance with aspects of the present invention includes no door rails.

According to aspects of the present invention, a second mounting surface is provided on each side of the header 16 to operably connect to the door rail 50. Preferably, at least one aperture is provided on the mounting surface operable for a fastener to mount the rear header 16 on the door rail 50 (e.g., screws, bolts, knobs, threaded fasteners, etc). Most preferably, a plurality of apertures and fasteners. Alternatively, the top in accordance with aspects of the present invention includes no door rails.

Referring to FIGS. 1-7 generally, in accordance with preferred aspects of the present invention, the cross bow 20 is positioned at the end of the coupling link 18. In accordance with preferred aspects of the present invention, the pivot joint 32 is at the top of the auxiliary link 28 (e.g., see FIG. 7). In accordance with preferred aspects of the present invention, the pivot joint 32 is at the forward most end of the auxiliary link 28 relative to when in the closed top position. In accordance with preferred aspects of the present invention, the coupling link 18 bracket 22 is located nearer to the rear header 16 than the pivot point 32 is located relative to the rear header when in the closed top position. In accordance with preferred aspects of the present invention, the cross bow 20 is located behind the pivot point 32 or nearer to the rear header 16 than the pivot point 32 is located relative to the rear header 16 when in the closed top position. In accordance with preferred aspects of the present invention, the cross bow 20 is not at the top of the auxiliary link 28. In accordance with preferred aspects of the present invention, the cross bow 20 is not directly attached to the auxiliary tensioning link 28. In accordance with preferred aspects of the present invention, the cross bow 20 is behind the coupling link 18 when in the closed top position. In accordance with preferred aspects of the present invention, the coupling link 18 is positioned partially below the front rail 14, when in the closed top position. In accordance with preferred aspects of the present invention, the generally the central portion of the coupling link 18 drops below the front rail 14, when moving into the closed top position. In accordance with preferred aspects of the present invention, the pivot point 32 is at the top of the auxiliary tensioning link 28 and the cross bow 20 is attached to the coupling link 18. In accordance with preferred aspects of the present invention, the pivot point 32 is not provided in any location that is not at the top of the auxiliary tensioning link 28 (e.g., FIG. 7), or forward end relative to when in the closed top position (e.g., FIGS. 1-2), and the cross bow 20 is not directly attached to any link that is not the coupling link 18, and the front of the cross bow 20 is directly attached to the coupling link 18.

Figure 8:
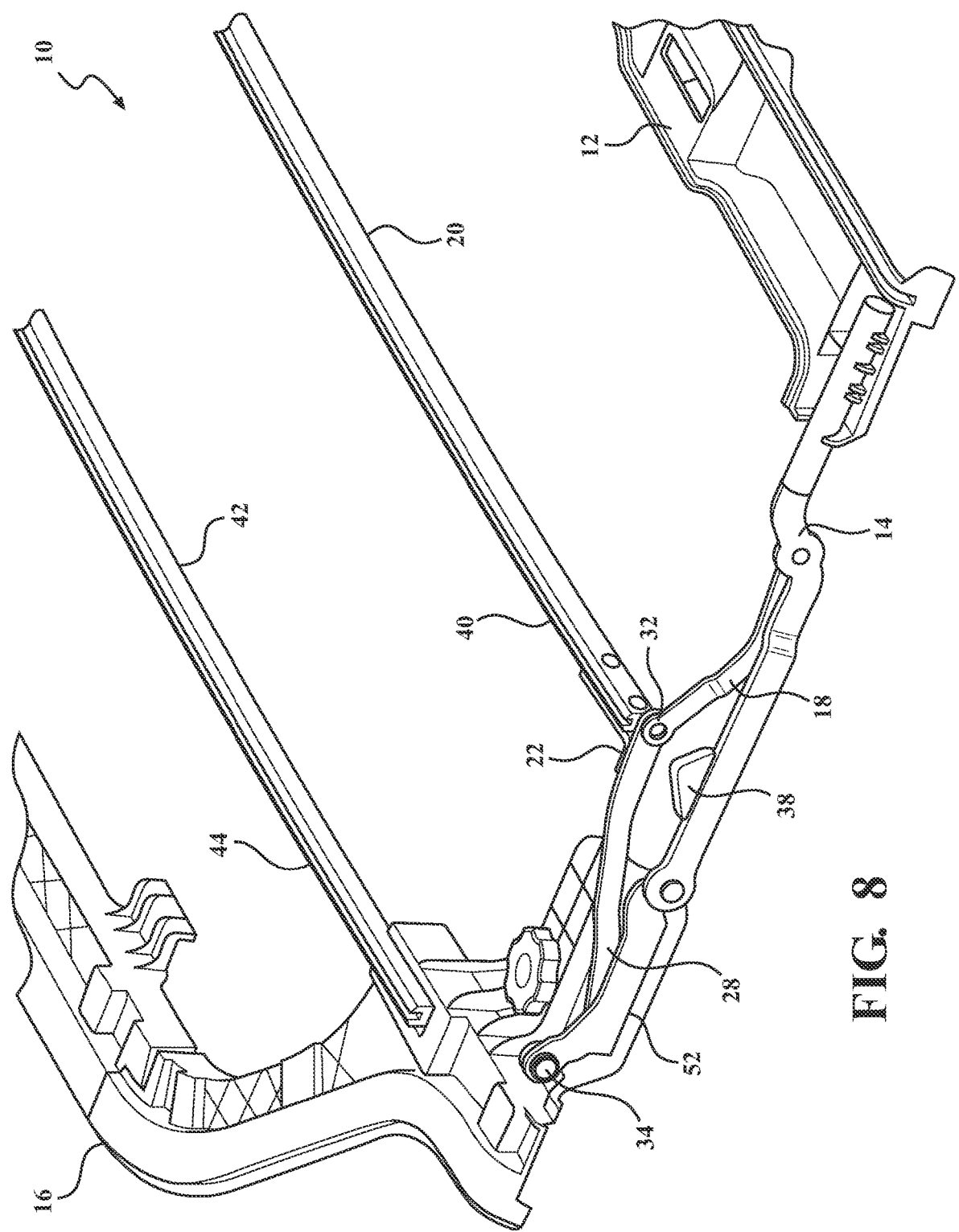
FIG. 8 is a perspective view of a soft panel top cover assembly with a pivot point at the top of an auxiliary tensioning link and a cross-car bow connected to an auxiliary tensioning link, in accordance with the present invention.
Figure 9:
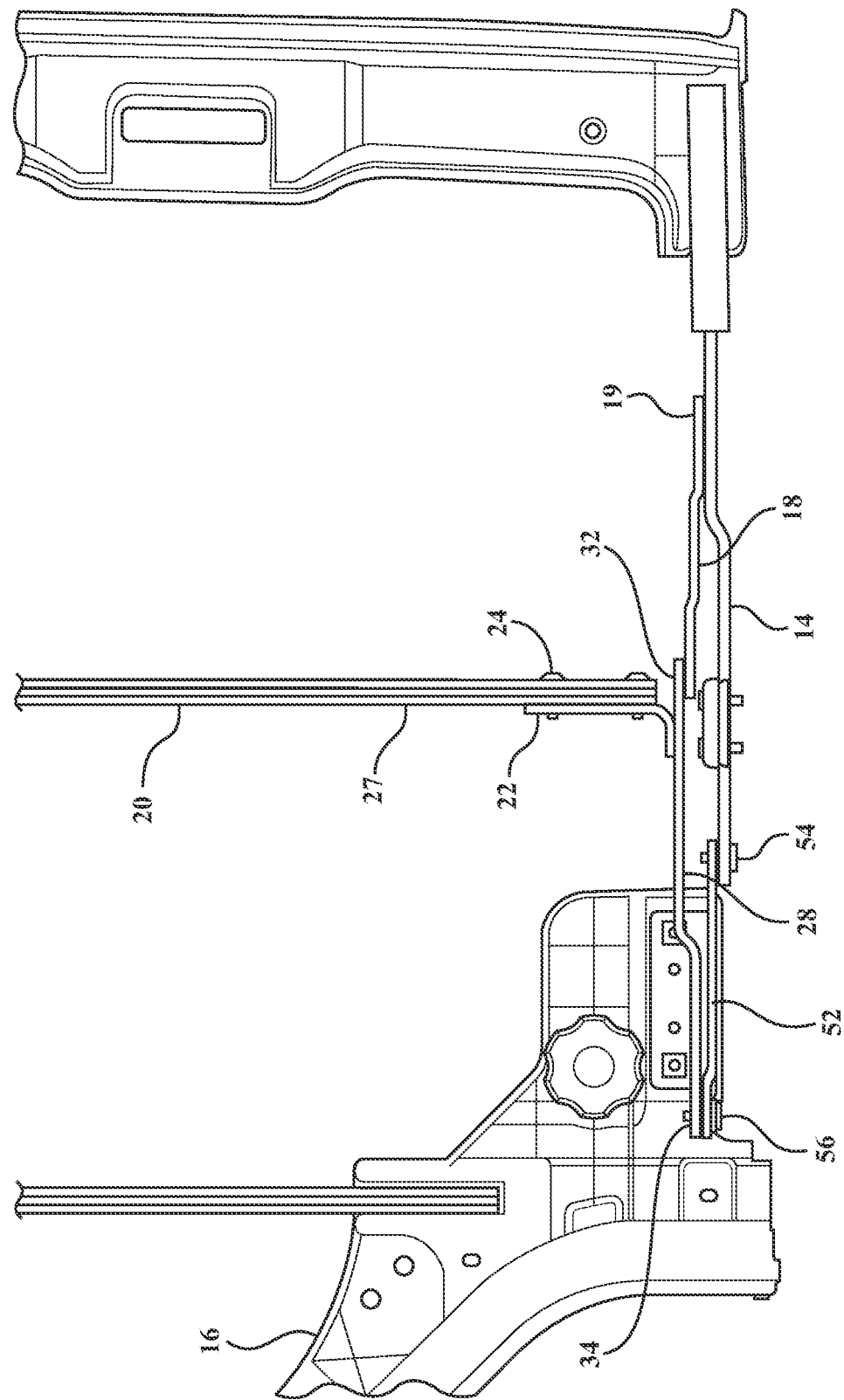
FIG. 9 is a top plan view of FIG. 8.
Figure 10:
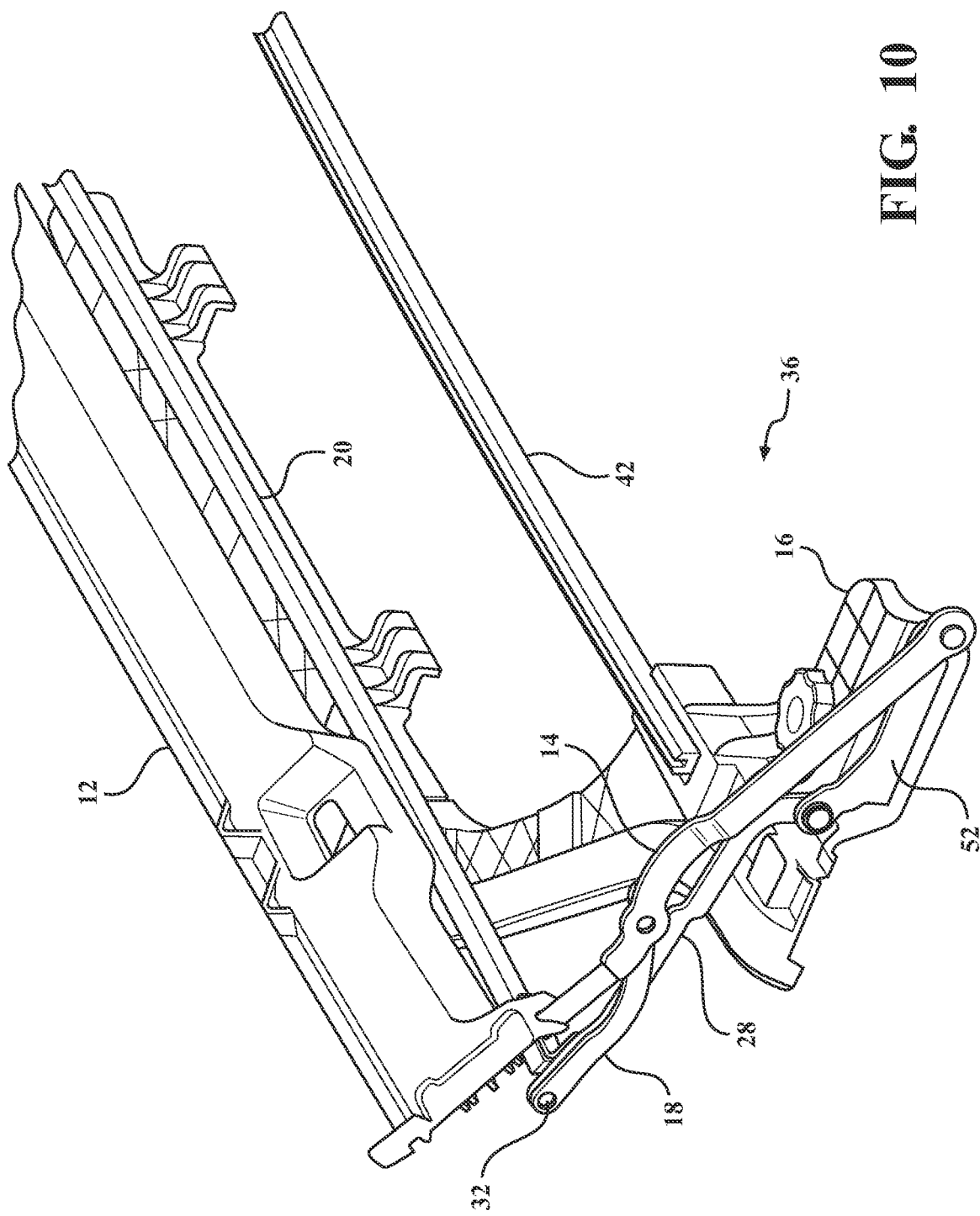
FIG. 10 is a perspective view of the assembly in an exemplary open position.

Referring now to FIGS. 8-10 generally, there is depicted the assembly 10 with similar features and like element numbers as described previously and depicted in the figures, including but not limited to FIG. 1, and will not be repeated here, but the description is incorporated in its entirety here—and wherein there are some alternative linkages/positions, as will now be described. The assembly 10 includes the tensioning bow 12, e.g., front header, connected to the front side rail 14. The rear header 16 is connected to the vehicle. The front side rail 14 is preferably connected to a second link 52 at pivot point 54. The second link is connected to the rear header 16 at another pivot point 56. Other suitable front side rail 14 attachment locations on alternative components are contemplated depending on the application without departure from the scope of the present invention. A coupling link 18 is connected to a cross-car bow 20, e.g., 2-bow, which bow 20 is operably connected to a cover 17 that is a roof top soft cover. The coupling link 18 is connected to the front side rail 14 at pivot point 19. An auxiliary tensioning link 28 is connected to the coupling link 18 at a pivot point 32. The auxiliary tensioning link 28 is also connected to the rear header 16 at pivot point 34, most preferably shared by the second link 52. A bracket 22 of the auxiliary tensioning link 28 is connected to the cross-car bow 20. Preferably, the bracket 22 is a weld-on bracket (e.g., bracket). Most preferably, the bracket 22 is a generally transverse member of the auxiliary tensioning link 28 extending generally cross-car and is connected to the rear side 27 of cross-car bow 20 by a plurality of fasteners 24. Alternatively, the bracket 22 is an integrally formed flange of the auxiliary tensioning link 28 extending generally cross-car and connected to the cross-car bow 20 by at least one fastener 24.

The pivot point 32 is advantageously located at the top of the auxiliary tensioning link 28. The cross-car bow 20 is connected to the bracket 22 of the auxiliary tensioning link 28 inboard to the pivot point 32/auxiliary tensioning link 28 body/link. The combination of pivot point 32 location at the top of the auxiliary tensioning link 28, and the bow 20 connected to the auxiliary tensioning link 28 bracket 22 provides significant advantages, including, but not limited to, superior rotation of the pivotal portion, shown generally at 36.

Referring now to FIGS. 1-10 generally, optionally, at least one attachment feature is provided. A first attachment portion operably coupled to or integrally formed with the rear header 16, most preferably, with the at least one mounting surface. The first attachment portion includes at least one mounting feature, preferably, at least one aperture, most preferably, at least two threaded apertures. A second attachment portion operably coupled to or integrally formed with the rear header 16, most preferably, adjacent the second mounting surface. The first attachment portion includes at least one mounting feature, preferably, at least one aperture, most preferably, at least two threaded apertures. Alternatively, the second attachment portion is operably coupled to or integrally formed with the door rail 50. At least one accessory or other predetermined attachment is operably connected to the first attachment portion and/or second attachment portion. By way of non-limiting example, at least one sunshade assessor, retractable sunshade, wind diffuser, mesh top, soft panel, side curtain shade, overhead shade, decorative shade, cross car member, sound bar, grab handle, lighting device, light bar, lock box, storage unit, tray, overhead barrier, vertical barrier, pet barrier, netting, roll bar or any other predetermined accessory and combinations thereof.

Each door rail 50 is connected to the rear header 16 (e.g., fastened, mechanical interface, bonded, adhesive, and combinations thereof), preferably, by at least one fastener, most preferably, by a plurality of fasteners, bonded, IR welded, mechanical fit, adhesive, etc and combinations thereof. Since the rear header 16 is most preferably a separately formed piece from the door rails 50,50, the rear header and door rails 50,50 do not need to ship through the entire supply chain as a larger unit. Selectively shipping disassembled for at least part of the supply chain allows for more efficient packaging footprint/arrangement and allows for a decreased shipping package size since a larger dimensioned packaging container is not required to accommodate a large rear header/door rails assembly. Selectively decreasing the shipping container size for the soft cover assembly of the present invention has a significant advantage and greatly decreases shipping costs, a significant advantage over conventional, bulky soft tops that necessitate larger shipping containers and drives increased shipping costs.

Alternatively, the door rails 50,50 are integrally formed with the rear header 16. Alternatively, according to aspects of the present invention, there are no door rails.

The rear header 16 is preferably one piece, most preferably, injection molded as a single piece. Alternatively, the rear header 16 is a plurality of pieces operably connected together, e.g., at least three pieces. If a plurality of pieces, they are operably connected together by e.g., brackets, fastened, mechanical interface, bonded, adhesive, by at least one fastener, by a plurality of fasteners bonded, IR welded, mechanical fit, adhesive, etc and combinations thereof. The rear header 16 is preferably a lightweight rear header. Most preferably, an injection molded lightweight material. Alternatively, the rear header is at least partially a wireframe. Generally, the rear header 16 is in operable sealing engagement with the vehicle. Typically, the rear header 16 is in operable sealing engagement with the hard top. Preferably, the rear header 16 is in operable sealing engagement with a hard-top seal.

Preferably, the door rail 50 has at least one seal, preferably, a plurality of seals. Optionally at least one seal, e.g., rubber bulb seal, is provided on at least one location of the door rail 50, e.g., within a channel or drip rail. Optionally, at least one seal is provided toward the end of the door rail 50 adjacent the rear header 16. Optionally, at least one seal is provided toward the forward end of the door rail 50 relative to the installed vehicle position. Optionally, at least one seal is provided toward the ends of the front header 12. Optionally, the rear header 16 includes at least one seal, e.g., rear seal, seal to hardtop, etc.

At least one latch mechanism is provided to selectively connect the tensioning bow 12 to the vehicle in the closed position, (e.g., latch to footman loop or each including a paddle or latch handle, latch and at least one spring.) The latch mechanism gives more reach than conventional latch handle devices, e.g., about 0.5 to 1.5 inches greater, preferably, at least about 1 inch greater). This makes latching to the vehicle easier. The paddle is rotatable. The latch is rotatable. The spring is additionally advantageous in that it reduces or eliminates rattling of the paddle because the paddle is biased to not freely move, whereas conventional latches moved around and rattled when not connected to the vehicle because there was nothing preventing that movement. The latch mechanism of the present invention accommodates the new predetermined vehicle interface. The interface is generally a locator for a factory finish hard top. When the assembly is folded to the closed position, the latch mechanisms can be secured to the vehicle, e.g., vehicle windshield header. In operation, each latch handle is pivoted, e.g., pivoted down, until the hook engages a respective footman loop or other vehicle structure. The latch is pivoted back up to complete the securement of the assembly to the vehicle header in the closed position.

Preferably, at least one cable is operably coupled to at least both sides of the cover 17. The cable is attached at one end to the door rail 50 and at the second end to the front header 12. The cable is preferably located in a pocket formed along the cover 17 edge, e.g., preferably sewn pocket. The second end of the cable can run at least partially cross car and operably couple to the rear header 16 by at least one spring for tensioning the top cover 17. Alternatively, the cable runs at least partially cross car and is operably coupled to the front header 12 by at least one spring for tensioning the top cover 17. Alternative attachments locations and cable locations are contemplated depending on the application without departure from the scope of the present invention.

Preferably, at least one trim is connected to the front header 12, e.g., by a plurality of fasteners received in a plurality of apertures, assisting in trapping the cover 17 material and trimming the leading edge of the first bow 12. A lip can be formed along the header 12 to operably retain the cover 17, preferably, wrapped around the front edge and sandwiched between opposing features of the header, e.g., using bracket(s), extrusion(s), molded part(s), adhesive, fasteners, etc. The cover 17 is operably connected to the rear header 16, preferably, wrapped around the rear edge and sandwiched between opposing features of the header 16, e.g., using bracket(s), extrusion(s), molded part(s), adhesive, fasteners, etc.

Preferably, at least one rear clamp mounting portion is provided. Preferably, the rear clamp mounting portion includes at least two apertures. At least one rear clamp is operably connected to the rear clamp mounting portion using a plurality of fasteners, e.g., bolts, screws, knobs, latches, etc. Preferably, the rear clamp includes at least one flange. Most preferably, the rear clamp includes at least one flange fitting under the cross-car member (e.g., at a substantially central cross car location to help secure the assembly to the cross-car member.

In accordance with an aspect of the present invention, a fastener arrangement (e.g., screw in bushing, rivet, threaded fastener, elbow bolt, threaded insert etc and combinations thereof) provides for all of the respective pivotal connections to allow the top to be cycled open/closed, as will be described in greater detail below. However, alternative pivot joint mechanisms can be used suitable for cycling the top open/closed depending on the application without departing from the scope of the present invention. Elimination of bushings and screw arrangements is contemplated without departure from the scope of the present invention. Incorporating at least one attachment bracket, e.g., including pivot points, is contemplated depending on the application without departure from the scope of the present invention. The pivot points are preferably integrated. More preferably, the pivot points are integrated molded in pivot points. It is contemplated that the pivot points are assembled.

Figure 11:
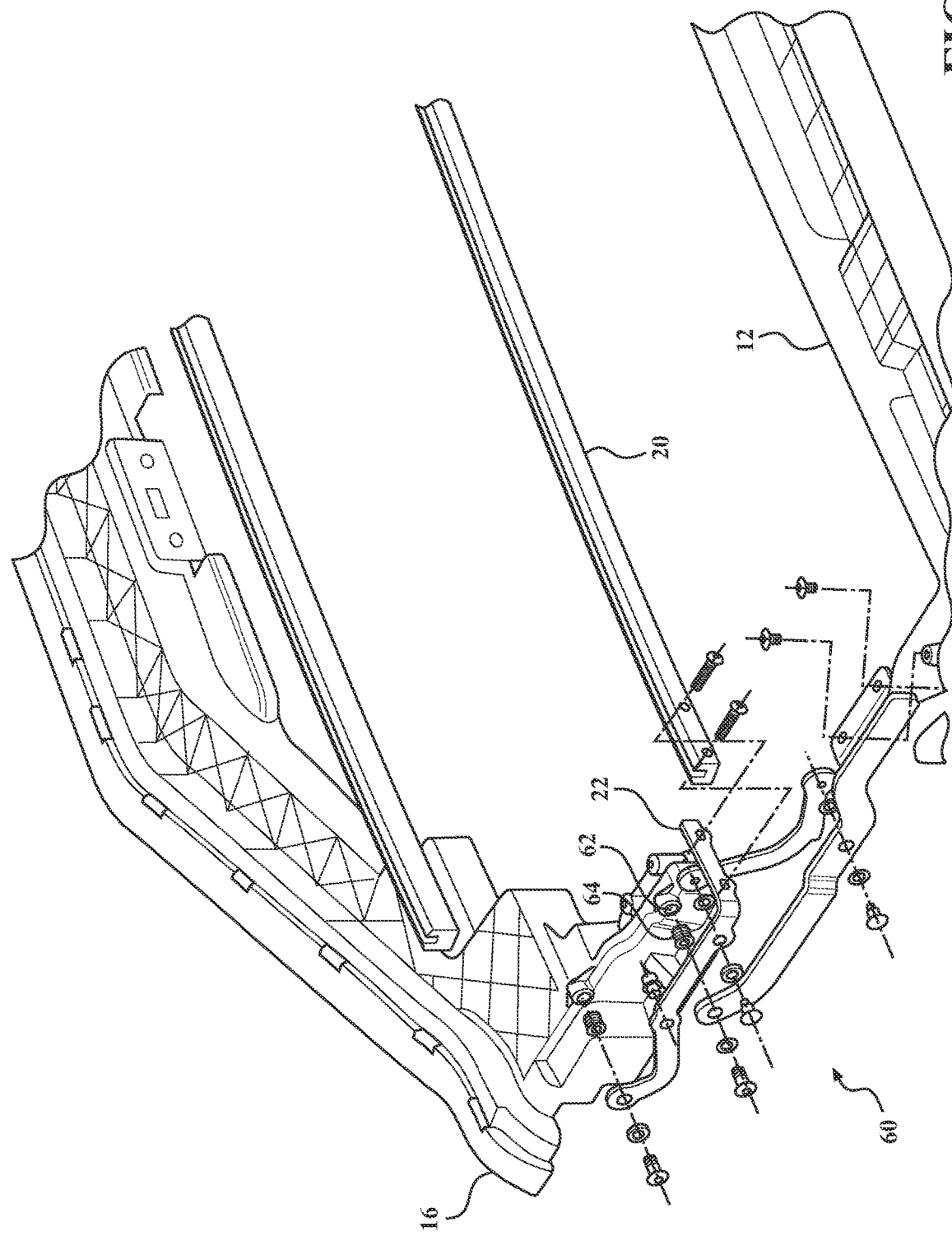
FIG. 11 is a perspective view of an exemplary connector arrangement, in accordance with the present invention.
Figure 12:
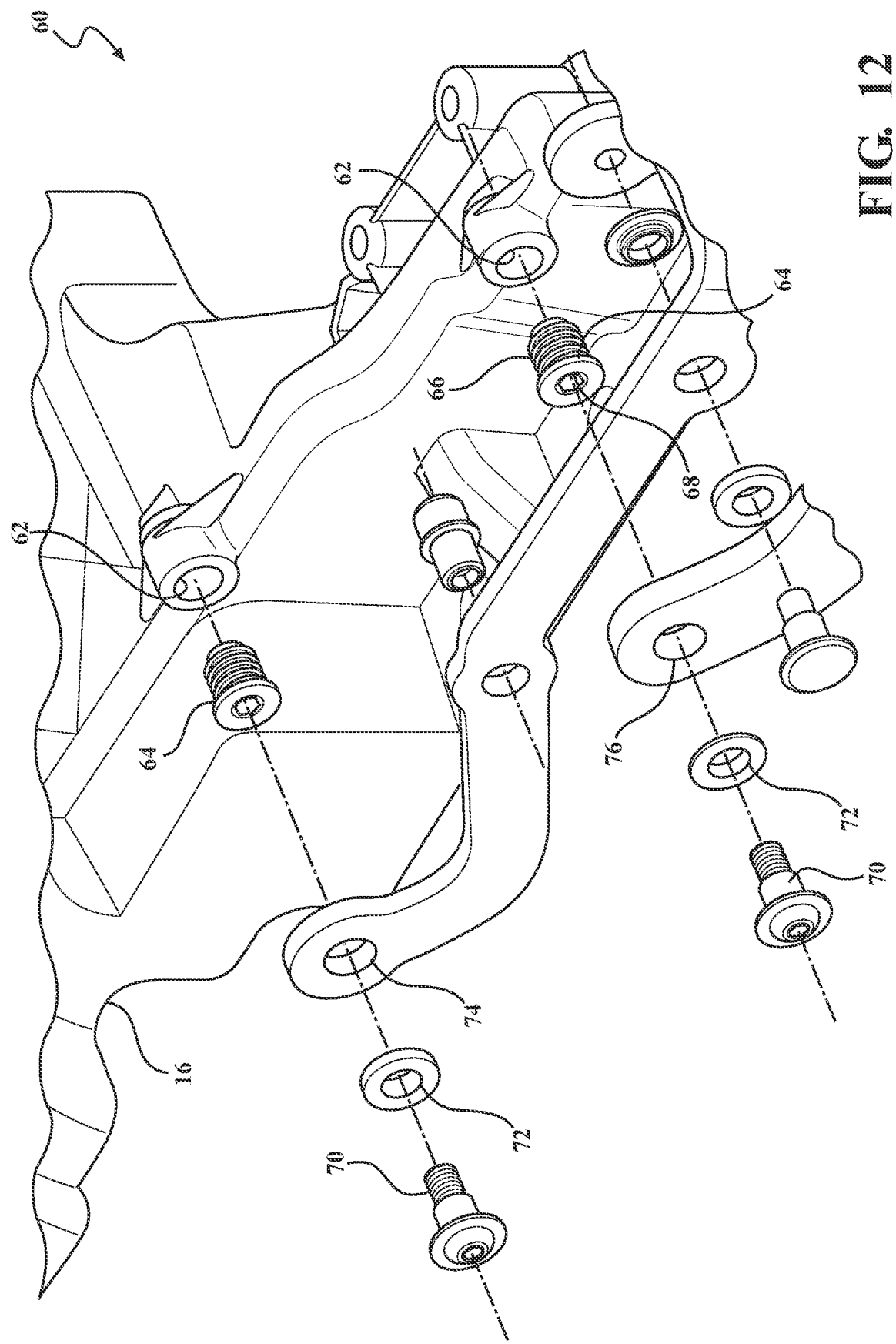
FIG. 12 is an exploded view of FIG. 11
Figure 13:
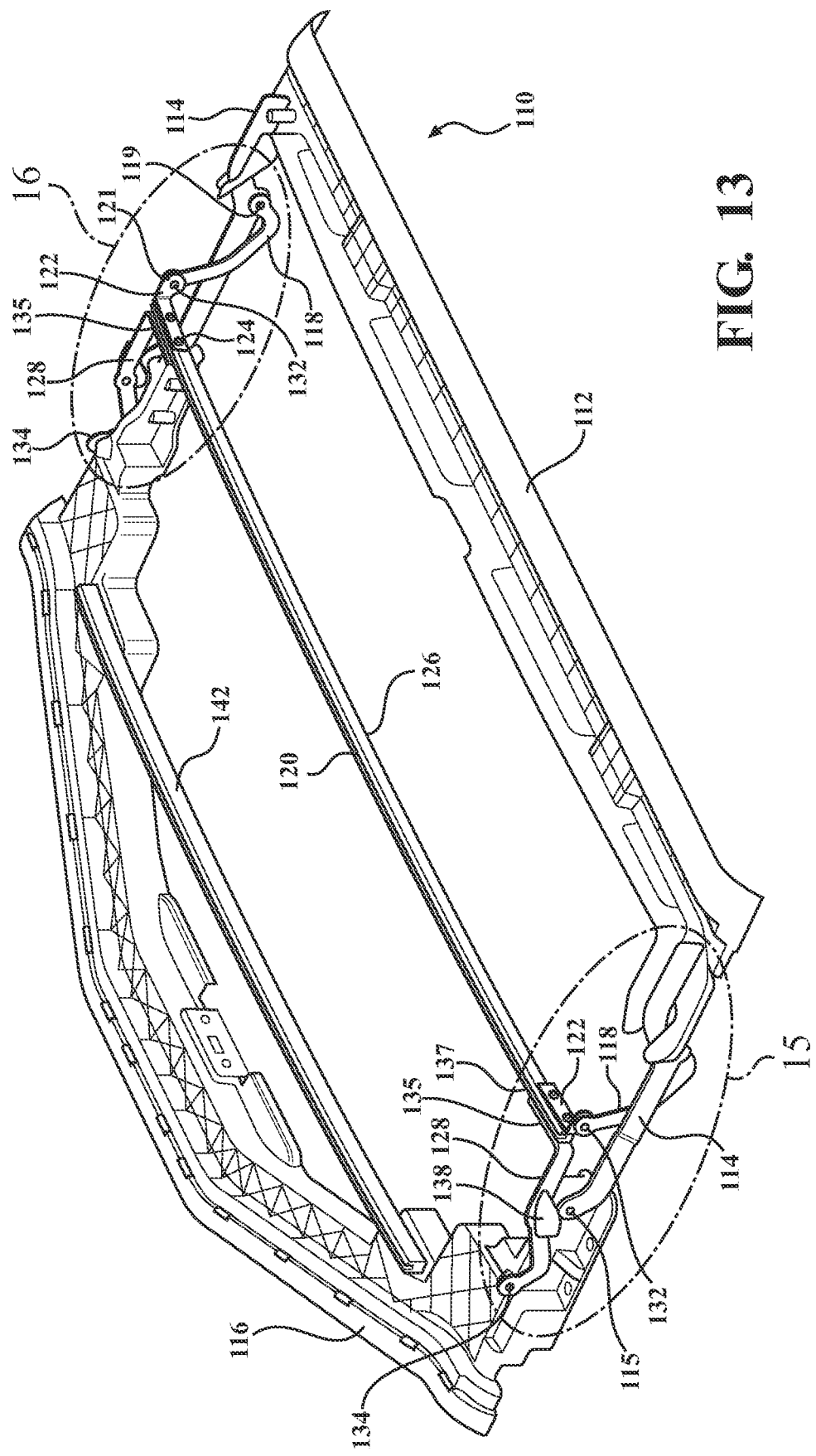
FIG. 13 is a perspective view of a soft panel top cover assembly, in accordance with the present invention.
Figure 14:
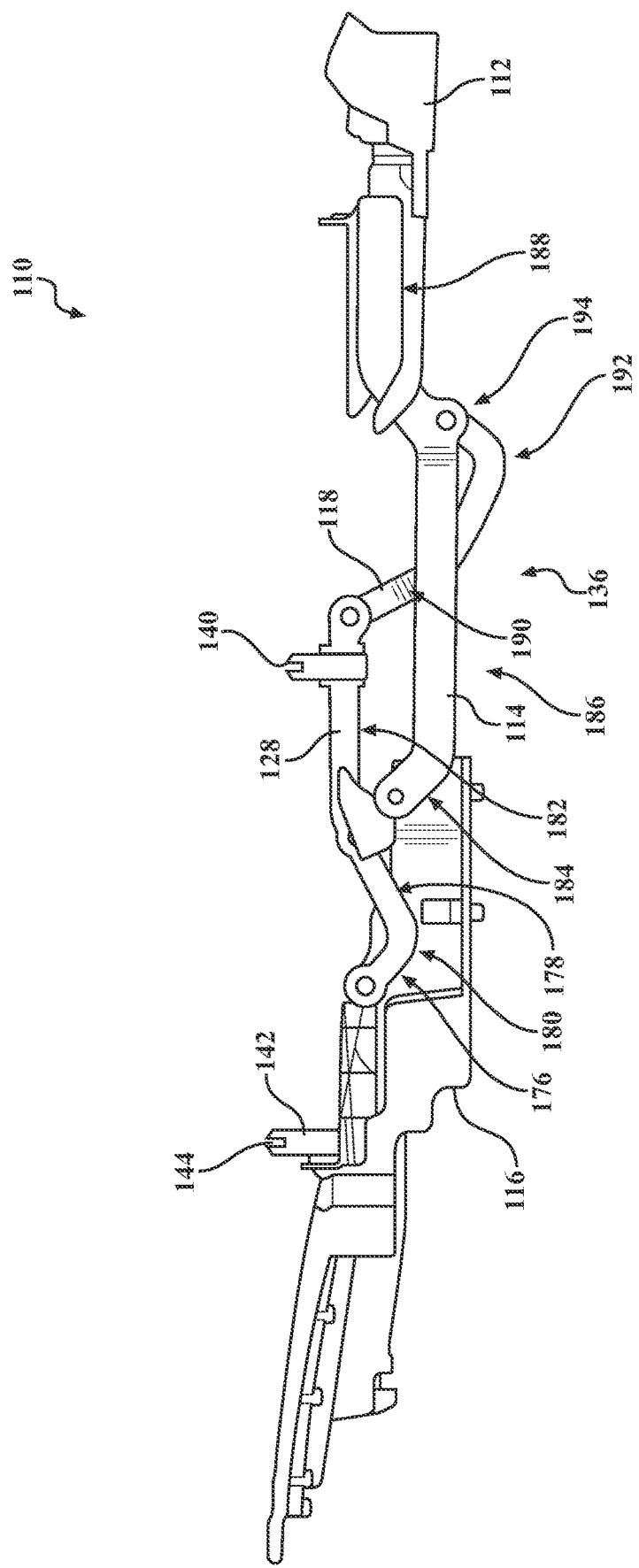
FIG. 14 is a side elevation view of FIG. 13.
Figure 15:
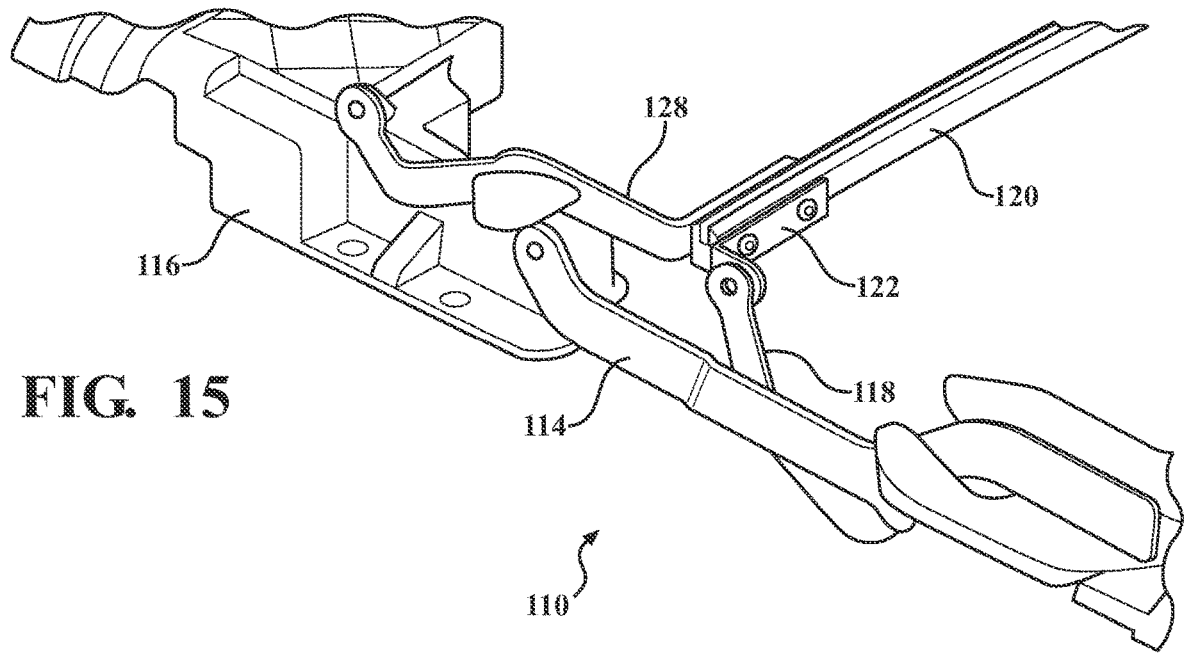
FIG. 15 is an enlarged perspective view of a first side of the assembly taken from FIG. 14.
Figure 16:
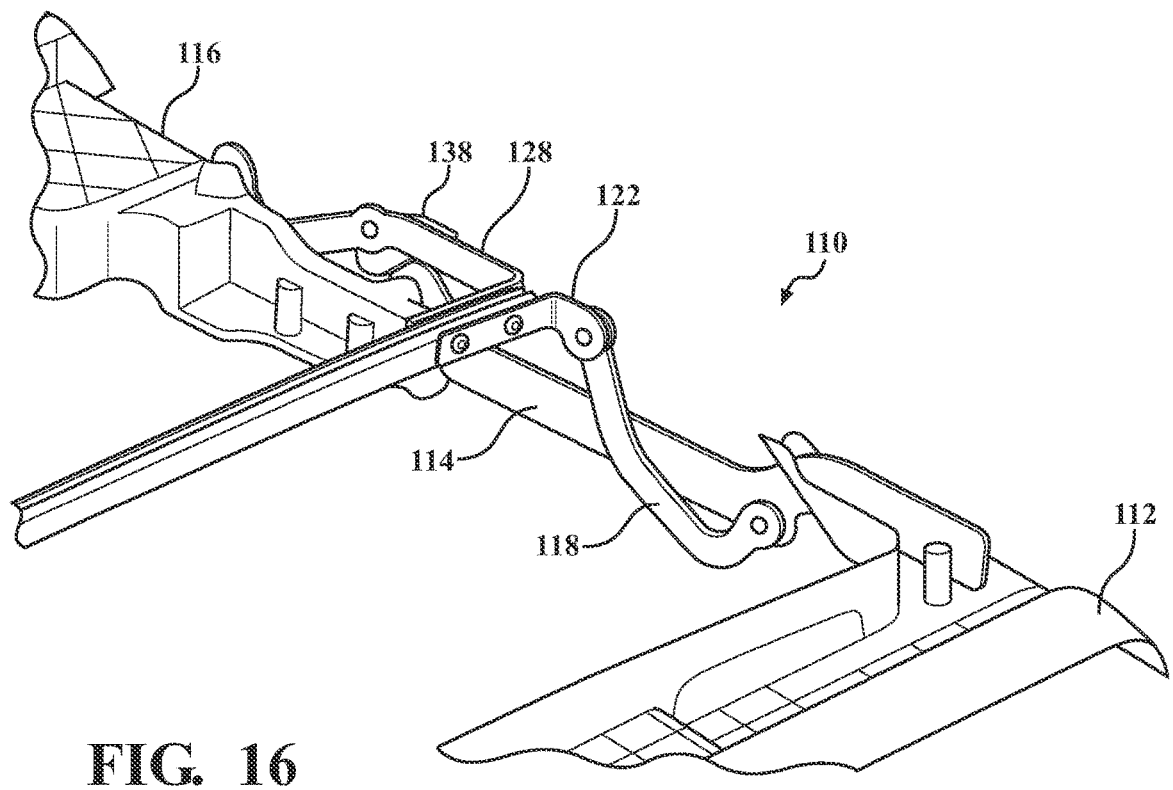
FIG. 16 is an enlarged perspective view of a second side of the assembly taken from FIG. 14.

FIGS. 11-12 depict an exemplary connector arrangement, indicated generally at 60, e.g., a screw in bushing arrangement that provides for the pivots on the molded rear header 16 for bows/links. At least one molded pocket 62 is provided for receiving a respective threaded insert 64. The threaded insert 64 is applied into the molded pocket 62 of the plastic molding of the rear header 16. Preferably, the threaded insert 64 (or "connector") is threaded on the outside 66 for attachment to the rear header 16. The insert 64 is also threaded on the inside 68 for attachment of a fastener 70, preferably shoulder bolt, for forming the pivot with the bows/links, e.g., with the front side rail 14, and/or auxiliary tensioning link 28, and/or second link 52, at respective pivot points. At least one washer 72 is preferably used for the fastener 70 aligned with an aperture 74 and 76, respectively, through the bows or links, e.g., aperture through the front side rail 14, and/or auxiliary tensioning link 28, and/or second link 52, etc. Preferably, a plurality of molded pockets 62 and threaded inserts 64 are provided on at least the rear header 16.

FIGS. 13-16 depict an alternate embodiment of a soft top cover assembly generally indicated at 110. Referring to FIGS. 13-16 generally, there is depicted the soft top cover assembly shown generally at 110 including a tensioning bow 112, e.g., front header, connected to a front side rail 114. A rear header 116 is connected to the vehicle and the front side rail 114 is preferably connected to the rear header 116. Most preferably, a pivot point 115 is provided on the rear header at the front side rail 114 attachment. Other suitable front side rail 114 attachment locations on alternative components are contemplated depending on the application without departure from the scope of the present invention. A coupling link 118 is connected to a cross-car bow 120, e.g., 2-bow, by way of a bracket 122 (e.g., bracket) that is a separate piece from the coupling link 118. The bracket 122 has an attachment portion 121 connected to the coupling link 118 at a pivot joint. Alternative, the bracket 122 is integral with the coupling link 118 as one piece. The bow 120 is operably connected to a cover 17 that is a roof top soft cover (e.g., FIG. 5). The coupling link 118 is connected to the front side rail 114 at pivot point 119. The bracket 122 is connected to the cross-car bow 120 with at least one fastener. Alternatively, the bracket 122 is integral with the cross-car bow 120 as a single piece therewith including the attachment portion 121 to connect to the coupling link 118. Preferably, the bracket 122 extends generally cross-car and is connected to the cross-car bow 120 by at least one fastener 124. Alternatively, the bracket 122 is a weld-on bracket. Most preferably, the bracket 122 extends generally cross-car along the cross-car bow 120 and is connected to the front side 126 of cross-car bow 120 by a plurality of fasteners 124. A pivot point 132 is located at the rear most end of the coupling link 118. The arrangement provides superior rotation of the pivotal portion, shown generally at 136.

At least one auxiliary tensioning link 128 is connected to the cross-car bow 120 and is also connected to the rear header 116 at pivot point 134. Preferably, the auxiliary tensioning link 128 includes a flange 135 or bracket operably connected to the cross-car bow 120. Most preferably, the bracket 135 extends generally cross-car along the cross-car bow 120 and is connected to the rear side 137 of cross-car bow 120 by at least one fastener. Alternatively, the bracket 135 is integral with the cross-car bow 120 as a single piece therewith and operably connected to the auxiliary tensioning link 128. Alternatively, the auxiliary tensioning link 128 is a weld-on bracket. The auxiliary tensioning link 128 is not located on a front surface of the cross-car bow. The auxiliary tensioning link 128 is most preferably attached on a rear surface of the cross-car bow. A pivot point 134 is located at the rear most end of the auxiliary tensioning link 128, e.g., pivot point located to the rear header 116. The arrangement in combination with the coupling link 118 provides superior rotation of the pivotal portion 136. Alternatively, the pivot point 134 is provided on a door rail 50, according to aspects of the present invention. Alternatively, the pivot point 134 is provided on the sport bar.

There are a plurality of bends in the connecting rods. The auxiliary connecting link 128 includes at least a first angled leg generally shown at 176 pivotally connected to the rear header 116 and a bend generally shown at 180, the first leg 176 with a laterally angled portion generally shown at 178 leading to a second leg generally shown at 182 that connects to the cross-bow 120. The second leg 182 is substantially horizontal when the top is in the closed position. The first side rail 114 has a first angled leg generally shown at 184, that is pivotally connected to the rear header 116, leading to a second leg 186 that connects to the coupling link 118 at pivot point 119. The second leg 186 is substantially horizontal when the tope is in the closed position. The second leg 186 leads to a laterally angled portion leading to a third leg generally shown at 188 that is connected to the front header 112 and is substantially horizontal when the top is in the closed position. The coupling link 118 includes a first angled leg 190 pivotally connected to the bracket 122 with a laterally downward angled portion 192, that extends lower than the first side rail 114 when the top is in a closed position, the portion 192 leading to a second leg generally shown at 194 that is angled upward and connects to the first side rail 114 at pivot point 119. It is understood that the present invention is adaptable for alternative angles and bends that are contemplated depending on the particular application without departure from the scope of the present invention.

FIGS. 13-16 depict the alternate embodiment of a closed sunroof position or closed roof top position covering or closing off the front roof top opening, for a sport utility vehicle generally indicated at 110. Although an SUV is depicted, it is understood that the present invention is operably adaptable for any vehicle, including, but not limited to, any SUV type, pickup truck, UTV, ATV, etc. FIG. 6 depicts an exemplary open sunroof position, incorporated herein. When the tensioning bow 112/front side rail 114 rotate rearward toward an open sunroof position, the coupling link 118, and the auxiliary tensioning link 128 rotate rearward with the cross-car bow 120 to the open sunroof position.

Preferably, there is no pivot point on said auxiliary tensioning link 128 to said cross-car bow 120. More preferably, the pivot point 132 is located at the top of the coupling link 118 and there is no pivot point from the auxiliary tensioning link 128 to said cross-car bow 120; rather the bracket 122 is attached to the cross-car bow 120.

Most preferably, the pivot point 132 is located at the top rear most end of the coupling link 118, generally adjacent to the cross-car bow 120 and above the front side rail 114, relative to the assembly 110 in the closed position, and there is no pivot point from the auxiliary tensioning link 128 to said cross-car bow 120; rather the bracket 122 is attached to the cross-car bow 120. Preferably, the flange 135 or bracket of the auxiliary tensioning link 128 is attached at the rear of bow 120 on the side/location directly opposite to the attachment location on the front of the bow 120 for the bracket 122 of the coupling link 118. Typically, the pivot point 134 of the auxiliary tensioning link 128 to the rear header 116 is generally set at the same, or substantially same, height as the front rail 114 attachment to the tensioning bow 112, relative to when the assembly in the closed position. Preferably, the coupling link 118 is inboard, relative to the cross-car direction, of the front side rail 114. Preferably, the attachment of the coupling link 118 is on the inboard side of the front side rail 114, e.g., at a front most end of said coupling link 118. Preferably, the attachment of the coupling link 118 is on the outboard side of said bracket 122. The coupling link 118 attachment point 121 to the bracket 135 is above and rearward of the attachment point 119 to the front side rail 114, relative to the assembly 110 being in the closed position. The coupling link 118 has a predetermined curvature such that the coupling link 118 extends from the attachment point 121 downward generally past the front rail 114 plane and curves upward to the attachment point 119. Preferably, the attachment point 132 of the front side rail 114 to the rear header 116 is lower and forward to the attachment point 134 of the auxiliary tensioning link 128 to the rear header 116. Preferably, a portion of the auxiliary tensioning link 128 is generally parallel to a portion of the front side rail 114, relative to the assembly 110 being in the closed position.

At least one stop 138 is provided, preferably, at least one on each side of the assembly 110. Preferably, the stop 138 is provided on the auxiliary tensioning link 128. It is understood that any other suitable stop 138 location and type and combination of elements to provide a stop, e.g., set the height of at least one bow or pivotal portion, is contemplated depending on the application without departure from the scope of the present invention. It is understood that the stop 138 is adaptable to rest upon another suitable predetermined part of the assembly 110 without departure from the scope of the present invention. It is understood that any other stop suitably configured to set the height and contact at least one bow with rotation to the open position is contemplated without departure of the scope of the present invention. Alternatively, no stop is required.

It is understood that alternative pivot point 115,119,132, 134 locations suitable for the pivoting of the articulating portion 136 depending on the application is/are contemplated without departure from the scope of the present invention.

Preferably, the cross-car bow 120 is a fabric management bow. Most preferably, the cross-car bow 120 is a fabric management bow operably coupled to the soft top cover 17 and operably configured and arranged to provide operable fabric management of the cover 17 between the closed position and the at least one open position (e.g., sunroof position). It is understood that more than one fabric management bow on articulating portion 136 (or any other predetermined location(s) of the assembly 110) can be provided depending on the application without departure from the scope of the present invention. Preferably, at least one channel 140 is provided to operably attach the cover 17 to the cross-car bow 120 (or any other predetermined location(s) of the assembly 10).

At least one additional bow 142 is operably connected to the rear header 116. Preferably, the least one additional bow 142 is a fabric management bow. Most preferably, the at least one additional bow 142 is a fabric management bow operably coupled to the soft top cover 17 and operably connected to a rear header 116, most preferably, fixedly connected to the rear header 116 such that the bow 142 has a fixed location. It is understood that more than one fabric management bow on the rear header (or any other predetermined location(s) of the assembly 110) can be provided depending on the application without departure from the scope of the present invention. Preferably, at least one channel 144 is provided to operably attach the cover 17 to the rear header 116 (or any other predetermined location(s) of the assembly 110). The at least one additional bow 142 is preferably fastened to the rear header, e.g. at least one screw, bolt, bracket etc). The fabric management bows manage the top cover as the assembly folds to the open position. The fabric management bows also minimize fabric movement in the closed position, which alleviates wind flap noise, in addition to managing the cover 17 during articulation and in the open position.

The rear header 116 operably seals with the rear top cover 46, e.g., hard top cover depicted in FIG. 5). The rear header 116 is preferably a lightweight injection molded material that is at least one piece, more preferably, a plurality of operably connected pieces, most preferably, at least three molded pieces operably connected together, e.g., fasteners, and/or bonded, and/or adhesive, and/or snap fit, and/or snap hook fit, and/or brackets, and/or mechanical fit, and/or mechanical fasteners and any combinations thereof. The rear header 116 preferably has at least two feet that rest on top of a cross vehicle member structure and helps set the height of the rear header 116 relative thereto. The rear header 116 includes at least one mounting surface 48 (e.g., FIG. 17) that operably connects to the vehicle, e.g., fasteners, mushroom fasteners/knobs, etc, connecting each mounting portion to a respective sport bar (vehicle roll bar). Alternatively, both sides of the rear header 116 only connects to respective door rails 50, which door rails 50 are connected to the vehicle structure (e.g., sport bars). Alternatively, there are no door rails. Alternatively, the first side rails 114 are connected to sport bars.

FIGS. 5-6 depicts a door rail 50 of the assembly 110 for operably connecting to the vehicle, e.g., to the fore/aft sport bar on both sides of the vehicle, and/or for providing a mounting location for the rear header 116 and/or for operably providing a weather tight door seal or top cover seal, on each side and/or providing a drip rail, etc. It is understood that the assembly 110 depicted in FIGS. 13-17 are preferably incorporated with same, incorporated here. Preferably, the door rail 50 is attached by at least one mounting surface, preferably, a first and second clamping surface attach to the vehicle (e.g., sport bar) using at least one fastener, e.g., fastener, threaded fastener, bolt, threaded mushroom knob fasteners etc. through at least one aperture through the at least one mounting surface Preferably, at least one mounting surface is provided on a rotatable member that rotates into engagement with the vehicle mounting surface. More preferably, the second clamping surface operable rotates up/down or side-to-side, most preferably, generally up/down to engage the underside of a vehicle part for mounting, e.g., under a sport bar, and preferably, the first mounting surface engages the upper side of the vehicle part for mounting, e.g., on top of the sport bar. The at least one mounting surface on each side of the header are preferably connected to the vehicle (e.g., sport bars).

Preferably, a second mounting surface is provided on each side of the header 116 to operably connect to the door rail 50. Preferably, at least one aperture is provided on the mounting surface operable for a fastener to mount the rear header 116 on the door rail 50 (e.g., screws, bolts, knobs, threaded fasteners, etc). Most preferably, a plurality of apertures and fasteners.

In accordance with an aspect of the present invention, a fastener arrangement (e.g., screw in bushing, rivet, threaded fastener, elbow bolt, threaded insert etc and combinations thereof) provides for all of the respective pivotal connections to allow the top to be cycled open/closed, as will be described in greater detail below. However, alternative pivot joint mechanisms can be used suitable for cycling the top open/closed depending on the application without departing from the scope of the present invention. Elimination of bushings and screw arrangements is contemplated without departure from the scope of the present invention. Incorporating at least one attachment bracket, e.g., including pivot points, is contemplated depending on the application without departure from the scope of the present invention. The pivot points are preferably integrated. More preferably, the pivot points are integrated molded in pivot points. It is contemplated that the pivot points are assembled.

FIGS. 11-12 depict an exemplary connector arrangement, indicated generally at 60, e.g., a screw in bushing arrangement that provides for the pivots on the molded rear header 116 for bows/links (identical as previously explained and depicted as to rear header 16). At least one molded pocket 62 is provided for receiving a respective threaded insert 64. The threaded insert 64 is applied into the molded pocket 62 of the plastic molding of the rear header 16. Preferably, the threaded insert 64 (or "connector") is threaded on the outside 66 for attachment to the rear header 16. The insert 64 is also threaded on the inside 68 for attachment of a fastener 70, preferably shoulder bolt, for forming the pivot with the bows/links, e.g., with the front side rail 114, and/or auxiliary tensioning link 128, etc at respective pivot points. At least one washer 72 is preferably used for the fastener 70 aligned with an aperture 74 and 76, respectively, through the bows or links, e.g., aperture through the front side rail 114, and/or auxiliary tensioning link 128, etc. Preferably, a plurality of molded pockets 62 and threaded inserts 64 are provided on at least the rear header 116.

Figure 17:
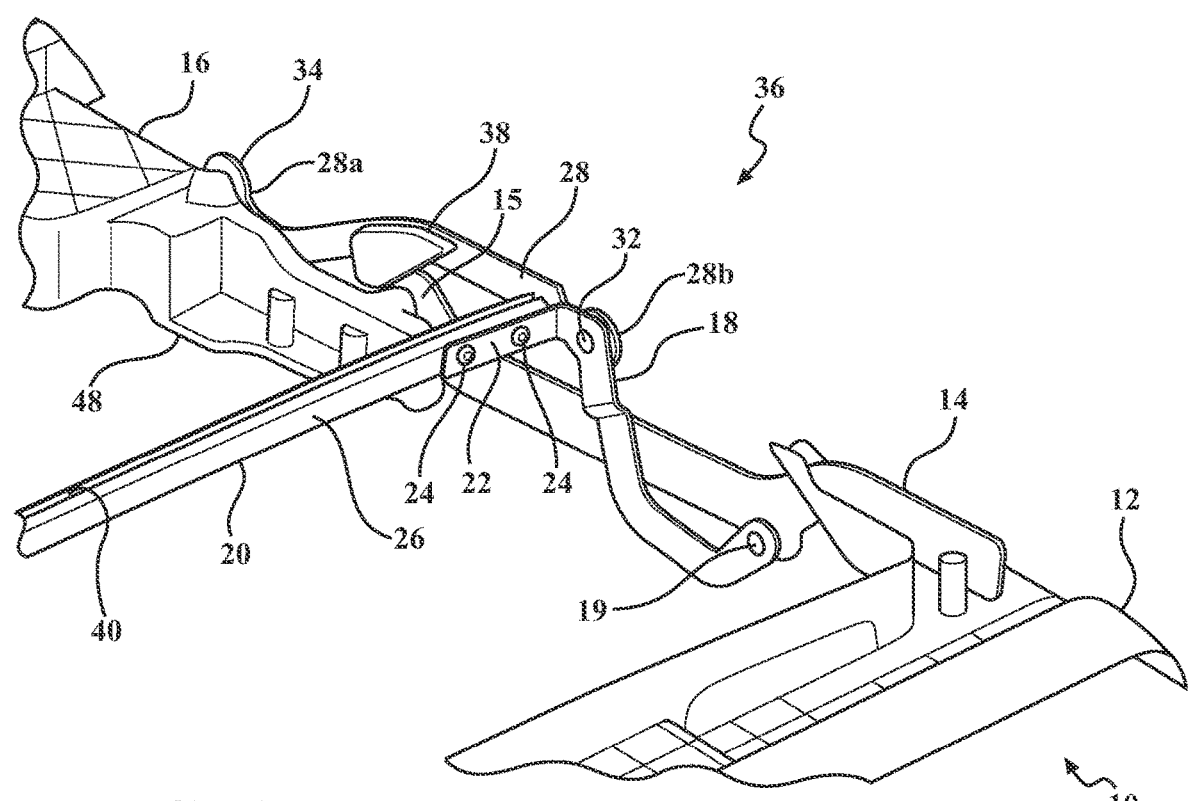
FIG. 17 is an enlarged perspective view of a driver side of a soft panel top cover assembly, in accordance with the present invention.

Referring now to FIG. 17 in general, in accordance with an aspect of the present invention, the 18 member is a second auxiliary tensioning link since 18 is solidly connected to the cross-car bow 20 and pivotal on the side of the main tensioning bow 14. The member 28 acts as a connecting link which connects the second auxiliary tensioning link 18 to the rear header 16. There is depicted the soft top cover assembly shown generally at 10 including the tensioning bow 12, e.g., front header, connected to the front side rail 14 or "main tensioning bow". The rear header 16 is connected to the vehicle and the front side rail 14 is preferably connected to the rear header 16. Most preferably, the pivot point 15 is provided on the rear header at the front side rail 14 attachment. Other suitable front side rail 14 attachment locations on alternative components are contemplated depending on the application without departure from the scope of the present invention. A second auxiliary tensioning link 18 or "auxiliary tensioning link" is connected to the cross-car bow 20, e.g., 2-bow, which bow 20 is operably connected to the cover 17 that is a roof top soft cover. The auxiliary tensioning link 18 is connected to the main tensioning bow 14 at attachment 19, e.g., pivot point 19. A bracket 22 of the auxiliary tensioning link 18 is connected to the cross-car bow 20. Preferably, the bracket 22 is an integrally formed flange of the auxiliary tensioning link 18 extending generally cross-car and connected to the cross-car bow 20 by at least one fastener 24. Alternatively, the bracket 22 is a weld-on bracket (e.g., bracket). Most preferably, the bracket 22 is a generally transverse member of the auxiliary tensioning link 18 extending generally cross-car and is connected to the front side 26 of cross-car bow 20 by a plurality of fasteners 24. The connecting link 28 is connected to the auxiliary tensioning link 18 at attachment point 32, e.g., pivot point. The connecting link 28 is also connected to the rear header 16 at pivot point 34, preferably at an end 28a of the connecting link.

The pivot point 32 is advantageously located at the top 28b of the connecting link 28. The cross-car bow 20 is connected to the auxiliary tensioning link 18 inboard to the pivot point 32/connecting link 28. The combination of pivot point 32 location at the top 28b of the connecting link 28, and the bow 20 connected to the auxiliary tensioning link 18 interior to the connecting link 28 provides significant advantages, including, but not limited to, superior rotation of the pivotal portion, shown generally at 36.

At least one stop 38 is provided, preferably, at least one on each side of the assembly 10. Preferably, the stop 38 is provided on the auxiliary tensioning link 28. It is understood that any other suitable stop 38 location and type and combination of elements to provide a stop, e.g., set the height of at least one bow or pivotal portion, is contemplated depending on the application without departure from the scope of the present invention. It is understood that the stop 38 is adaptable to rest upon another suitable predetermined part of the assembly 10 without departure from the scope of the present invention. It is understood that any other stop suitably configured to set the height and contact at least one bow with rotation to the open position is contemplated without departure of the scope of the present invention. Alternatively, no stop is required.

It is understood that alternative pivot point 15,19,34 locations suitable for the pivoting of the articulating portion 36 depending on the application is/are contemplated without departure from the scope of the present invention.

Preferably, the cross-car bow 20 is a fabric management bow. Most preferably, the cross-car bow 20 is a fabric management bow operably coupled to the soft top cover 17 and operably configured and arranged to provide operable fabric management of the cover 17 between the closed position and the at least one open position (e.g., sunroof position). It is understood that more than one fabric management bow on articulating portion 36 (or any other predetermined location(s) of the assembly 10) can be provided depending on the application without departure from the scope of the present invention. Preferably, at least one channel 40 is provided to operably attach the cover 17 to the cross-car bow 20 (or any other predetermined location(s) of the assembly 10).

Figure 4:
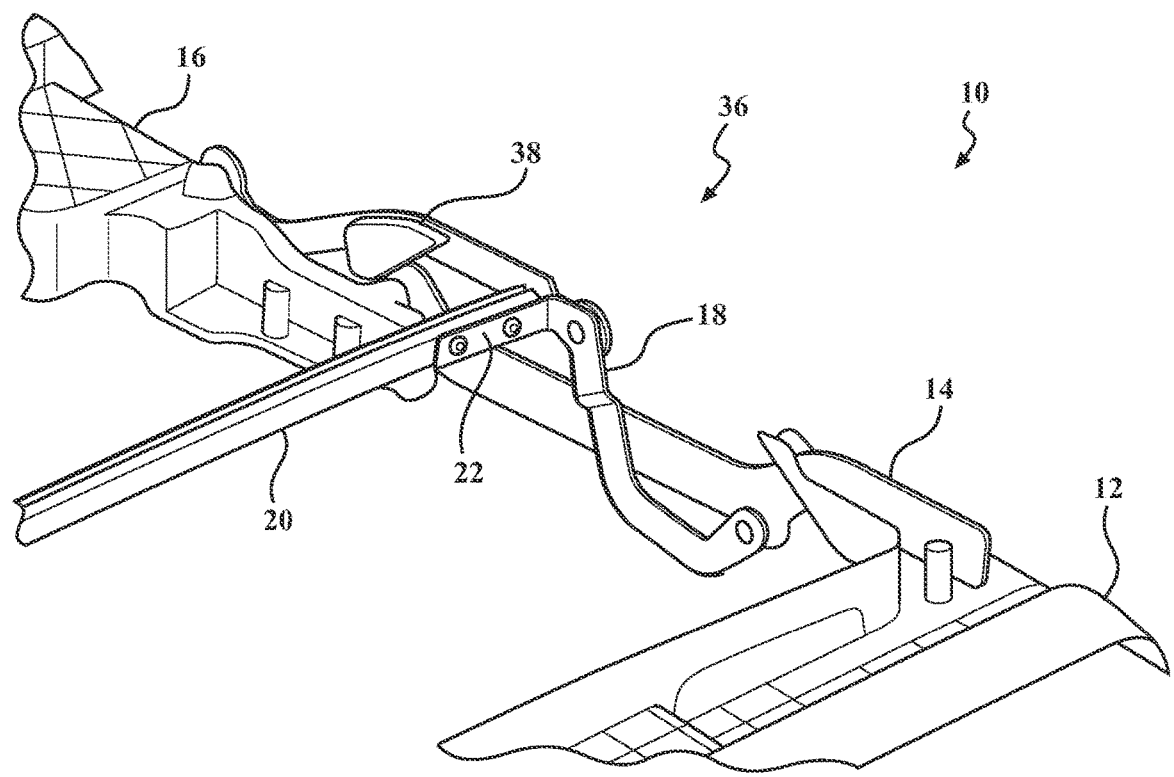
FIG. 4 is an enlarged perspective view taken from 'B' of FIG. 1.

At least one additional bow 42 is operably connected to the rear header 16 (e.g., incorporated here from FIG. 4). Preferably, the least one additional bow 42 is a fabric management bow. Most preferably, the at least one additional bow 42 is a fabric management bow operably coupled to the soft top cover 17 and operably connected to a rear header 16, most preferably, fixedly connected to the rear header 16 such that the bow 42 has a fixed location. It is understood that more than one fabric management bow on the rear header (or any other predetermined location(s) of the assembly 10) can be provided depending on the application without departure from the scope of the present invention. Preferably, at least one channel 44 is provided to operably attach the cover 17 to the rear header 16 (or any other predetermined location(s) of the assembly 10). The at least one additional bow 42 is preferably fastened to the rear header, e.g. at least one screw, bolt, bracket etc). The fabric management bows manage the top cover as the assembly folds to the open position. The fabric management bows also minimize fabric movement in the closed position, which alleviates wind flap noise, in addition to managing the cover 17 during articulation and in the open position.

The rear header 16 operably seals with the rear top cover 46, e.g., hard top cover. The rear header 16 is preferably a lightweight injection molded material that is at least one piece, more preferably, a plurality of operably connected pieces, most preferably, at least three molded pieces operably connected together, e.g., fasteners, and/or bonded, and/or adhesive, and/or snap fit, and/or snap hook fit, and/or brackets, and/or mechanical fit, and/or mechanical fasteners and any combinations thereof. The rear header 16 preferably has at least two feet that rest on top of a cross vehicle member structure and helps set the height of the rear header 16 relative thereto. The rear header 16 includes at least one mounting surface 48 (that operably connects to the vehicle, e.g., fasteners, mushroom fasteners/knobs, etc, connecting each mounting portion to a respective sport bar (vehicle roll bar). Alternatively, both sides of the rear header 16 only connects to respective door rails 50, which door rails 50 are connected to the vehicle (e.g., sport bars).

FIGS. 5-6 depicts a door rail 50 of the assembly 10 for operably connecting to the vehicle, e.g., to the fore/aft sport bar on both sides of the vehicle, and/or for providing a mounting location for the rear header 16 and/or for operably providing a weather tight door seal or top cover seal, on each side and/or providing a drip rail, etc. It is understood that assembly depicted in FIG. 17 is preferably incorporated with same. Preferably, the door rail 50 is attached by at least one mounting surface, preferably, a first and second clamping surface attach to the vehicle (e.g., sport bar) using at least one fastener, e.g., fastener, threaded fastener, bolt, threaded mushroom knob fasteners etc. through at least one aperture through the at least one mounting surface Preferably, at least one mounting surface is provided on a rotatable member that rotates into engagement with the vehicle mounting surface. More preferably, the second clamping surface operable rotates up/down or side-to-side, most preferably, generally up/down to engage the underside of a vehicle part for mounting, e.g., under a sport bar, and preferably, the first mounting surface engages the upper side of the vehicle part for mounting, e.g., on top of the sport bar. The at least one mounting surface on each side of the header are preferably connected to the vehicle (e.g., sport bars).

Preferably, a second mounting surface is provided on each side of the header 16 to operably connect to the door rail 50. Preferably, at least one aperture is provided on the mounting surface operable for a fastener to mount the rear header 16 on the door rail 50 (e.g., screws, bolts, knobs, threaded fasteners, etc). Most preferably, a plurality of apertures and fasteners.

Referring to FIGS. 1-17 generally, the left half of the assembly 10,110 and corresponding features are substantially mirror image/symmetrical to the right half of the assembly 10,110 and corresponding features depicted in the figures or described herein. The soft front cockpit cover assembly 10,110 is preferably a foldable and sealable with a hardtop roof portion of the vehicle. The soft panel top assembly 10,110 is connected to a vehicle. The vehicle includes a windshield frame with side members, e.g., sport bars, extending therefrom and a cross bar or cross member operably connecting the side members substantially adjacent the rear of the driver/passenger compartment, although the top is operably adaptable for any other location contemplated. The soft panel top assembly 10,110 folds back to give the occupant a quick and easy open air effect, e.g., lightweight and easily operated at a short interval stop, without completely removing the soft panel top assembly 10,110 from the vehicle. Folding the soft panel top assembly 10,110 between a closed position and at least one open position is also achievable without the occupant needing to leave the vehicle and eliminates removal and storage of roof panels from the vehicle. Once cycled to the open position, the soft panel top assembly 10,110 also does not require strapping the assembly down to maintain open air positioning. Further, the soft panel top assembly 10,110 includes built in stops to set the height of the pivotal portion 36,136. The assembly 10,110 geometry generally follows the hardtop contours. The assembly 10,110 is in sealing engagement against the hardtop's seal(s). When closed, assembly 10,110 also seals with the vehicle windshield frame seal(s). Preferably, bushing and fastener arrangement is used for all of the respective pivot points and pivot joints. However, alternative suitable pivot mechanisms can be used without departing from the scope of the invention depending on the particular application. The tensioning bow 12,112 is adapted for releasable attachment to the windshield frame for opening and closing the assembly 10,110. The tensioning bow 12,112 has at least attachment mechanisms, e.g., latches, paddles/spring/hook mechanism, or any other suitable attachment mechanism, connected thereto that have a hand actuated clamping arrangement to selectively connect to the windshield frame. The tensioning bow 12,112 is preferably molded plastic, e.g., plastic with steel reinforcement and comprises two attachment mechanisms, which when in the closed position attach to opposing features of the vehicle, e.g., metal loops, footman loops, molded parts, stamped parts, or any other vehicle interface etc, generally located under the visors of the vehicle, and when cycling to the open position, travel with the first bow. The attachment mechanisms provide for securing closure of the top to the existing windshield frame and are readily released by an operator for opening of the assembly. Optionally, at least one limiting stop is used to set the height of the articulating portion or any link thereof in the open or closed positions. In accordance with an aspect of the present invention, the cover 17 is sewn and/or adhered or otherwise attached to portions that fit within the respective channels, e.g., an extrusion is stitched or sewn and/or adhered to the cover 17. Depending on the application the extruded materials are generally polypropylene, polyethylene, flexible polyvinyl chloride, structural acrylonitrile butadiene styrene, thermoplastic elastomer of operable densities or other material suitable for making the extrusion (bulb portion and attachment flange). If more than one extruded material is used the extruded materials are compatible materials to melt bond to one another under pressure depending on the application. The rear header 16 has a plurality of attachment features for coupling to the cross member, e.g., at least one rear clamp, at least one rear clamp mounting portion and/or at least two locating brackets connected to the rear header, e.g., bottom thereof, by at least two fasteners, which interface with the cross member and/or hardtop to keep the rear header from lifting off the cross member in the installed position. The at least two feet operably locate to the cross member or hardtop, e.g., including a lip to a leading edge. Preferably, the feet generally set the rear header height relative to the hardtop. For installation, preferably, no modification to the hardtop, no drilling of any holes in the vehicle, or changing of any existing remaining components is required. The manufactures front cockpit panels are removed and the soft panel top assembly 10,110 is installed. Preferably, the door rails 50 can ship separate from the rear header 16,116, which allows that the door rails 50 do not need to be connected to the rear header 16,116 or are not integrally formed with the rear header 16,116—thus, allowing significant decreases in shipping container size and shipping costs. Alternatively, the soft panel top assembly 10,110 ships in the entire supply chain as a rear header connected to or integrally formed with door rails. The rear header 16,116 is a rear header closeout operable to engage at least one seal existing on the hard top portion and provides a weatherproof seal, e.g., under compression with a bulb seal, lip, mucket, gasket or any other suitable seal to prevent leaks between the hard top portion and assembly 10,110. The assembly 10,110 can also include at least one seal. It is within the scope of the invention to manufacture the rear header 16,116 as a wireframe (e.g., bent wire frame welded together), lightweight molded plastic, or other suitable lightweight material and configurations and/or combinations thereof suitable to withstand predetermined strength requirements and to sealingly engage with the hard top portion, depending on the particular application without departing from the scope of the invention. The rear header 16,116 is a single piece or plurality of pieces. Preferably, the rear header 16,116 has at least three lightweight molded pieces operably connected together. More preferably, the rear header 16,116 is a single piece. Most preferably, the rear header 16,116 is a single piece and the door rails 50 are connected thereto, e.g., at some point in the supply chain or by the consumer. The assembly 10,110 is an after-market assembly and/or an original equipment manufacturer component. By way of non-limiting example, the manufactured door rails 50 ship unassembled to the rear header 16,116 to reduce shipping costs. At a final assembly facility, the door rails 50 are connected to the rear header 16,116 and delivered to the OEM, e.g., supporting just-in-time line requirements. This significantly reduces unit costs because the packaging shipping size is smaller to realize lower shipping rates. Preferably, a plastic retainer slides over a metal backing piece connected by a fastener to keep the cover 17 connected on the rear header 16,116, e.g., the cover is sandwiched, and/or secured with a plurality fasteners. Similarly, preferably, the tensioning bow 12,112 has a similar metal backing and plastic retainer connecting the cover 17 to the header, e.g., the cover is sandwiched. The cover 17 is preferably secured to the rear header 16,116 and/or tensioning bow 12,112 without snaps. The assembly can also include a plurality of seals, e.g., at least one header seal, at least one door rail seal, at least one rearward door rail seal, at least one drip rail seal. The drip rail can include at least one aperture for draining water. Optionally, a seal, e.g., lip seal, bulb seal, edge seal, edge gimp, or any suitable seal, is operably connected to the cover 17 coupled to at least the rear edge surface of the rear header 16,116. By way of example, the lip seal is sewn and/or bonded to the cover 17 and sandwiched between the cover 17 and rear header 16 at the rear of the assembly 10,110. By way of non-limiting example, the seals are an open cell foam, a closed cell foam material, EPDM (ethylene propylene diene monomer), TPE (thermoplastic elastomers), TPV (thermoplastic vulcanizate), etc., a foam rubber, an extruded rubber, a formed/molded rubber mucket, and/or a silicone material. The seals are preferably foam seals, most preferably soft sponge EPDM closed cell foam. Alternatively, at least one of the pairs of seals are a rubber mucket which is more robust. It is understood that the present invention is suitable for two door and four door vehicles. A headliner material or other dampening material(s) for reducing noise in the cockpit or improved climate control is contemplated without departure from the scope of the present invention. The headliner/dampening material is operably connected on the cockpit side of the cover, e.g., sewn. Alternatively, the headliner/dampening material is inserted into at least one pocket or sandwiched between layers of cover material. The 2-door and 4-door descriptions and drawings described herein are not limiting. It is understood that any embodiment, and combinations thereof, described herein can be modified and is/are utilizable on any convertible, 2-door or 4-door vehicle. The present invention is directed to a stowable soft top assembly and operably adoptable for any vehicles and vehicle types, e.g soft top assembly for 4-door and 2-door SUVs, all-terrain vehicles, utility task vehicles, off road vehicles, pickup trucks, Jeeps™, pickups, open air pickup trucks, any motor vehicles, etc. The left half of the soft panel top cover assembly 10,110 and corresponding features are substantially mirror image/symmetrical to the right half of the 10,110 and corresponding features depicted in the figures. The pivot points are integrated. Preferably, the pivot points are integrated molded in pivot points. It is contemplated that, alternatively, the pivot points are assembled. Providing at least one fabric management bow, e.g., fixed and/or articulating bow(s), is contemplated without departure from the present invention. The cover 17 is a predetermined material, e.g., soft material, fabric, twill acrylic fabric or sailcloth fabric.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A soft front cockpit cover assembly adapted for a vehicle, comprising:
   an articulating portion operably coupled to a rear header or adapted to operably connect to the vehicle, the rear header operably adapted for sealing engagement with a rear roof top portion of said vehicle, said articulating portion including a coupling link and an auxiliary tensioning link;

a cross-car bow operably connected to a cover and to the auxiliary tensioning link;

a bracket operably connected to said cross-car bow, said bracket operably connected to said coupling link at the top end of the coupling link;

wherein rotating the articulating portion allows the cover to move between at least a closed position closing off a roof top opening of said vehicle and at least one open position.

2. The soft front cockpit cover assembly of claim 1, wherein said bracket includes an attachment portion connected to the coupling link at a pivot joint.

3. The soft front cockpit cover assembly of claim 1, further comprising a flange on the auxiliary tensioning link operably connected to a rear surface of said cross-car bow.

4. The soft front cockpit cover assembly of claim 1, wherein said bracket is an L-bracket attached to the coupling link and to a front surface of the cross-bow.

5. The soft front cockpit cover assembly of claim 1, wherein the coupling link is connected to a first side rail at a pivot point.

6. The soft front cockpit cover assembly of claim 5, wherein the first side rail is connected to a tensioning bow adapted to be selectively coupled to a windshield frame portion of said vehicle.

7. The soft front cockpit cover assembly of claim 5, wherein the coupling link is located inboard relative to the first side rail.

8. The soft front cockpit cover assembly of claim 5, wherein the first side rail is rotatably connected to the rear header at a pivot point.

9. The soft front cockpit cover assembly of claim 5, wherein the coupling link pivot joint to the bracket is at a location above and rearward of the coupling link pivot point to the front side rail, when in the closed position.

10. The soft front cockpit cover assembly of claim 5, wherein the pivot point of the auxiliary tensioning link to the rear header is above and rearward to the pivot point of the first side rail.

11. The soft front cockpit cover assembly of claim 5, wherein the coupling link extends from the attachment portion of the bracket downward below the front side rail and curves upward to the pivot point with the first side rail, when in the closed position.

12. The soft front cockpit cover assembly of claim 5, wherein a portion of the auxiliary tensioning link is substantially parallel to a portion of the front side rail, when in the closed position.

13. The soft front cockpit cover assembly of claim 1, wherein the auxiliary tensioning link is rotatably connected to the rear header at a pivot point.

14. The soft front cockpit cover assembly of claim 1, further comprising at least one stop setting the height of the articulating portion.

15. The soft front cockpit cover assembly of claim 1, wherein the pivot joint provides the connecting point of the coupling link located at the top most and rearmost end of the coupling link in combination with the bracket attached to the cross-car bow inboard from the pivot joint allows articulation of the pivotal portion without binding.

16. The soft front cockpit cover assembly of claim 1, further comprising at least one connector arrangement including a molded pocket that receives a threaded insert to provide linkage attachment to said rear header.

17. The soft front cockpit cover assembly of claim 5, wherein the coupling link pivot joint to the bracket is at a location above and rearward of the coupling link pivot point to the front side rail, when in the closed position.

18. A soft front cockpit cover assembly adapted for a sport utility vehicle, comprising:

a cross-car bow operably connected to a cover;

a rear header, the rear header operably adapted for a weathertight seal with a rear roof hard top portion of the vehicle, at least one auxiliary tensioning link operably connected to the cross-car bow;

at least one coupling link rotatably connected to at least one front rail at a pivot point that is lower than the cross-car bow when the soft front cockpit cover assembly is in a closed position;

a bracket operably connected to the cross-car bow, the bracket connected at the other end of the coupling link;

wherein rotating the soft front cockpit cover assembly in first and second directions allows the cover to move between the closed position closing off at least one roof top opening and at least one open position.

19. The soft front cockpit cover assembly of claim 18, wherein the attachment of the auxiliary tensioning link to said cross-car bow is a fixed connection that is not on the front of the cross-bow.

20. A soft front cockpit cover assembly, comprising:

an articulating portion including a cross-car bow operably coupled to a cover;

a rear header;

at least one pair of rotatable auxiliary tensioning links operably fixedly connected to the cross-car bow;

at least one pair of connecting links operably connected to the cross-car bow at a top of the connecting links;

a front header operably connected to a pair of main tensioning bows;

a pair of first side rails fixedly operably connected to the main tensioning bows, the connecting links operably connected to the first side rails;

a plurality of threaded apertures in the rear header operable to receive a plurality of threaded inserts for attaching the auxiliary tensioning links and first side rails;

wherein selectively rotating the articulating portion in first and second directions allows the cover to move between a closed position and an open position, respectively.

* * * * *